(12) United States Patent
Tabuchi

(10) Patent No.: US 6,446,093 B2
(45) Date of Patent: *Sep. 3, 2002

(54) DOCUMENT SHARING MANAGEMENT METHOD FOR A DISTRIBUTED SYSTEM

(75) Inventor: Masahiro Tabuchi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,762

(22) Filed: Feb. 13, 1998

(30) Foreign Application Priority Data

Feb. 14, 1997 (JP) .............................. 9-047333

(51) Int. Cl.[7] .............................................. G06F 17/00
(52) U.S. Cl. ..................... 707/205; 707/530; 709/226
(58) Field of Search ...................... 707/1–206, 530–540; 709/200–207, 220–226; 713/201

(56) References Cited

U.S. PATENT DOCUMENTS

| | | | | |
|---|---|---|---|---|
| 5,586,312 A | * | 12/1996 | Johnson et al. ................ 707/10 |
| 5,659,735 A | * | 8/1997 | Parrish et al. ............... 707/533 |
| 5,787,175 A | * | 7/1998 | Carter ........................... 707/8 |
| 5,867,799 A | * | 2/1999 | Lang et al. .................... 707/10 |
| 5,928,363 A | * | 7/1999 | Ruvolo ........................ 713/201 |
| 5,987,454 A | * | 11/1999 | Hobbs ............................ 707/4 |
| 6,029,175 A | * | 2/2000 | Chow et al. ................... 707/10 |

FOREIGN PATENT DOCUMENTS

| | | |
|---|---|---|
| JP | 6-68044 | 3/1994 |
| JP | 6-83691 | 3/1994 |
| JP | 6-175905 | 6/1994 |
| JP | 7-85020 | 3/1995 |
| JP | 7-50884 | 5/1995 |
| JP | 7-319828 | 12/1995 |
| JP | 8-77201 | 3/1996 |

* cited by examiner

*Primary Examiner*—David Jung
(74) *Attorney, Agent, or Firm*—Foley & Lardner

(57) ABSTRACT

In a distributed system comprising a document server and a plurality of clients which are connected to the document server via a network, each of the plurality of clients transmits, to the document server, an original transaction with information indicative of at least one client which uses a document. The document server receives the original transaction, processes the original transaction as a global document generation transaction to produce a document object, transmits, to the at least one client, the global transaction as a local transaction. The at least one client receives the local transaction and means for performing the local transaction to produce a virtual document object corresponding to the document object.

66 Claims, 20 Drawing Sheets

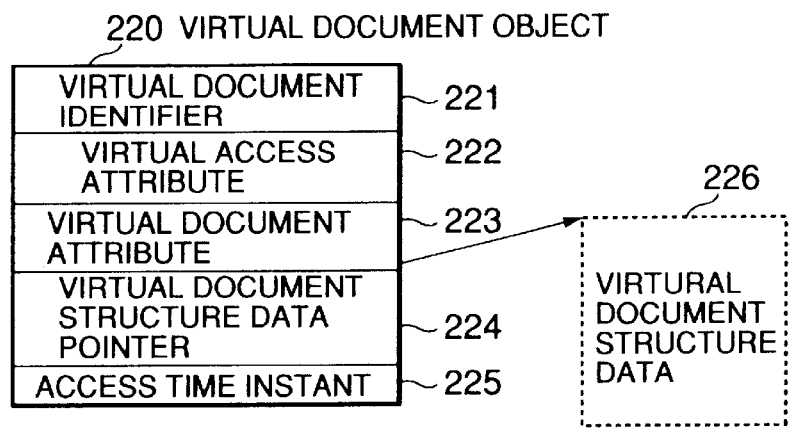
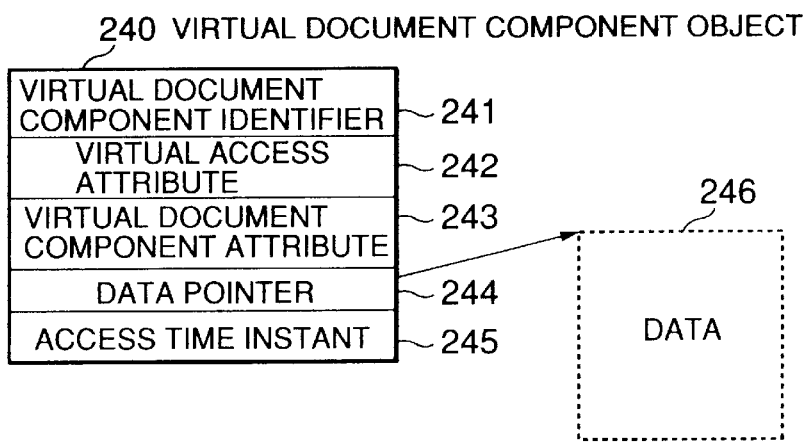
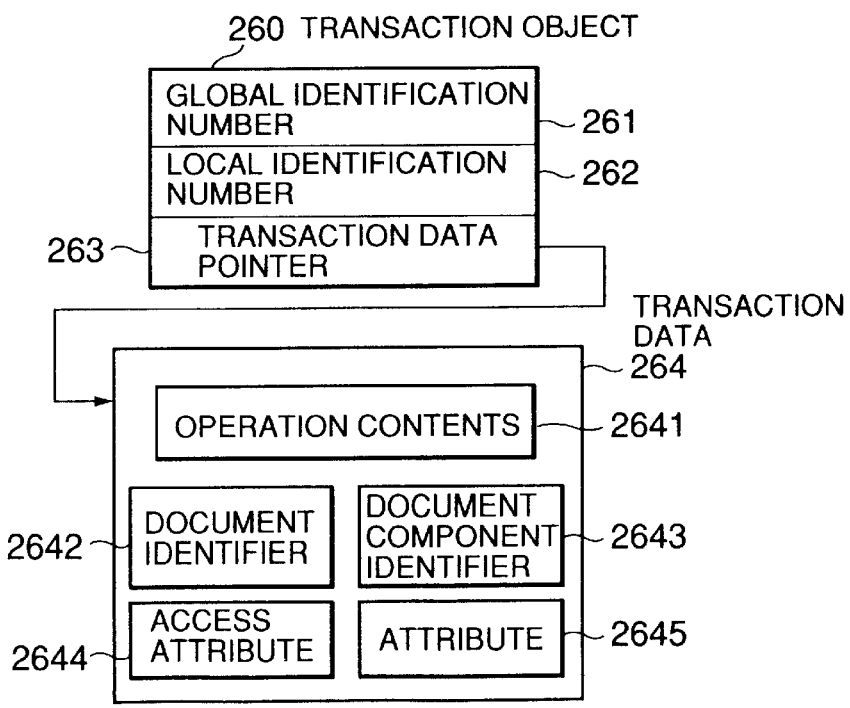

DOCUMENT SHARING MANAGEMENT METHOD FOR A DISTRIBUTED SYSTEM

BACKGROUND OF THE INVENTION

This invention relates to a distributed system comprising a document server and a plurality of clients which are connected to the document server via a network and, more particularly, to a method of managing a document shared in the distributed system.

In prior art, various proposals are already made as regards technique for permitting the plurality of clients carrying out an editing operation for the same document. By way example, a document managing method (which will be herein called a first prior art) is disclosed in Japanese Unexamined Patent Publication of Tokkai (JP-A) No. 7-85020 (which will be herein called a first reference) on Mar. 31, 1995. In the first prior art according to the first reference, a plurality of clients share the same document in a document data base on a server. On simultaneously carrying out the editing operation on the same document by the plurality of clients, the document as an editing object is copied to a document work file for each client. As a result, each client simultaneously carries out the editing operation on the document without affecting other clients. However, in the first prior art according to the first reference, it is difficult for each client to confirm edited contents in other clients. This is because the same document is copied to the document work file for each client and the editing operation is independently carried out by each client. As a result, it is difficult for a plurality of clients to work in cooperation with the edited contents mutually confirmed for the same document.

In addition, a computer conference device (which will be herein called a second prior art) is disclosed in Japanese Examined Patent Publication of Tokkou (JP-B) No. 7-50884 (which will be herein called a second reference) on May 31, 1995. In the second prior art according to the second reference, each client is provided with a document file for storing the same contents. When a plurality of clients simultaneously refer and renew a document in the document file, an editing command, etc. generated by each client are transmitted to a server and the server unanimously transmits the editing command, etc. to all of the clients to make all of the clients process the editing command, etc. With this structure, it is possible to carry out the editing operation for the same document with edited results confirmed by all of the clients.

In the second prior art according to the above-mentioned second reference, it is possible to proceed with group work with edited contents for each client confirmed by all of the clients. This is because, when the editing operation is carried out by any client, the editing operation is delivered to all of clients via the server so that the document of each client is edited in the similar manner in other clients. However, the second prior art according to the second reference is disadvantageous in that it is impossible to carry out access control for each portion composing the document so as to make a particular client see a portion in the document. Such access control is required on carrying out the group work by a plurality of clients. In this sense, the second prior art according to the second reference is still insufficient for applying to a distributed cooperation system.

Furthermore, a document database-based system (which will be herein called a third prior art) is known. Such a document database-based system is, for example, Notes which is developed by Lotus Development Corporation in U. S. A. In the third prior art, the same document is referred to a document structure defined by predetermined document components via an application program on the basis of the document structure. In addition, writing is simultaneously carried out for different document components (portions of the document) in the same document. Furthermore, in order to prevent data destruction by simultaneous access to the same portion in the same document, an access limitation is made on the basis of a lock used by a conventional database technique.

In the third prior art, if structure of the document is defined as a unit each of the predetermined document components, it is possible to carry out the access control so as to refer or modify the portion (the document component) in the document. From this point of view, the third prior art is most adapted for a group work system among the above-mentioned three prior arts. However, performing of such an access control is restricted to each unit or each of the predetermined document components. As a result, it is impossible for the third prior art to carry out the access control as regards, as a unit, a document component which will be prepared from now. Specifically, the third prior art can carry out, for the document having a structure which is designed the document so as to share by all of the clients, the access control on the portion defined as the document component but the third prior art cannot dynamically generate, in the document, a memorandum for private use or another memorandum which should like to make particular clients see that satisfy a particular condition. This is because, for that purpose, an area playing a role in the memorandum must be preliminarily prepared on definition of the document structure. In general, the required area for the memorandum depends on progress of the group work. As a result, it is difficult to preliminarily prepare the required area on definition of the document structure.

Various other distributed systems are already known. By way of example, a system and method for document database retrieval (which will be herein called a fourth prior art) is disclosed in Japanese Unexamined Patent Publication of Tokkai (JP-A) No. 8-77201 (which will be herein called a third reference) on Mar. 22, 1996. The fourth prior art according to the third reference improves the productivity, maintainability, etc., of an application program by enabling standardized access to a document database consisting of a main text file and bibliographical information by a standard database language.

A ciphered file sharing method (which will be herein called a fifth prior art) is disclosed in Japanese Unexamined Patent Publication of Tokkai (JP-A) No. 6-17505 (which will be herein called a fourth reference) on Jun. 24, 1994. The fifth prior art according to the fourth reference reduces management information even at the time of enciphering plural files by different keys by giving a hierarchical reference premission to a user, in the sharing method of a ciphered file.

A file sharing system between system (which will be herein called a sixth prior art) is disclosed in Japanese Unexamined Patent Publication of Tokkai (JP-A) No. 6-83691 (which will be herein called a fifth reference) on Mar. 25, 1994. The sixth prior art according to the fifth reference shares files between plural systems by accessing the files present in the respective system on a network at an application software level by a server for accessing the files based on requests from the users of the respective systems.

A method for sharing file by utilizing network of distributed system (which will be herein called a seventh prior art)

is disclosed in Japanese Unexamined Patent Publication of Tokkai (JP-A) No. 6-68044 (which will be herein called a sixth reference) on Mar. 11, 1994. The seventh prior art according to the sixth reference reduces the communication processing overhead for file access request and file information transfer in each processing node and a file management node and to shorten the time required for access from each processing node to a shared file.

A system operation method for shared disk device (which will be herein called an eighth prior art) is disclosed in Japanese Unexamined Patent Publication of Tokkai (JP-A) No. 7-319828 (which will be herein called a seventh reference) on Dec. 8, 1995. The eighth prior art according to the seventh reference improves a restoration ratio in transaction unit at the time of generating a fault by excluding the restriction of access to a shared file to be accessed from plural application programs in plural processing systems.

At any rate, each of the first through the eighth prior arts is not useful at all or insufficient in a case of applying to the distributed cooperation system where a plurality of clients carry out group work.

SUMMARY OF THE INVENTION

It is therefore an object of this invention to provide a distributed system and a document sharing management method which are capable of assigning an access limitation on generation of a new component for a document.

It is another object of this invention to provide a distributed system and a document sharing management method of the type described, which are capable of editing a portion of the same document of the same contents by all of clients.

It is still another object of this invention to provide a distributed system and a document sharing management method of the type described, which are capable of editing another portion of the same document by particular clients or a particular group only.

It is yet another object of this invention to provide a distributed system and a document sharing management method of the type described, which are capable of utilizing a still another portion of the same document as a memorandum for private use.

Other objects of this invention will become clear as the description proceeds.

A situation to which this invention is applicable is for managing a document shared in a distributed system comprising a document server and a plurality of clients which are connected to said document server via a network.

According to an aspect of this invention, the above-mentioned method comprises the step of transmitting, from each client to the document server, an original transaction with information indicative of at least one client which uses a document.

The above-mentioned method further may comprises the steps of receiving the original transaction in the document server, of processing, in the document server, the original transaction as a global transaction to produce a document object, and of transmitting, from the document server to the at least one client, the global transaction as a local transaction. The above-mentioned method further may comprises the steps of receiving the local transaction in the at least one client, and of performing, in the at least one client, the local transaction to produce a virtual document object corresponding to the document object.

A distributed system to which this invention is applicable comprises a document server and a plurality of clients which are connected to the document server via a network.

In the distributed system according to an aspect of this invention, each of the plurality of clients comprises means for transmitting, to the document server, an original transaction with information indicative of at least one client which uses a document.

In the afore-mentioned distributed system, the document server preferably may comprise means for receiving the original transaction, means for processing the original transaction as a global document generation transaction to produce a document object, and means for transmitting, to the at least one client, the global transaction as a local transaction.

In the afore-mentioned distributed system, the at least one client preferably may comprise means for receiving the local transaction and means for performing the local transaction to produce a virtual document object corresponding to the document object.

A recording medium to which this invention is applicable is for use in a distributed system comprising a document server and a plurality of clients which are connected to the document server via a network.

According to a first aspect of this invention, the above-mentioned recording medium is for recording a first program to make each of the plurality of clients execute the procedure of transmitting, to the document server, an original transaction with information indicative of at lest one client which uses a document. Desirably, the abovementioned recording medium further may record a second program to make the document server execute the procedures of receiving the original transaction, of processing the original transaction as a global transaction to produce a document object, and of transmitting, to the at least one client, the global transaction as a local transaction. Desirably, the above-mentioned recording medium further may record a third program to make the at least one client execute the procedures of receiving the local transaction and of performing the local transaction to produce a virtual document object corresponding to the document object.

According to a second aspect of this invention, a recording medium records a program to make a client execute the procedure of transmitting, to a document server, an original transaction with information indicative of at least one client which uses a document. The document server may transmit a local transaction to the at least one client. In this event, the above-mentioned recording medium preferably further may record an additional program to make the client execute the procedures of receiving the local transaction and of performing the local transaction to produce a virtual document object corresponding to a document object generated in the document server.

According to a third aspect of this invention, a recording medium records a program to make a document server execute the procedures of receiving, from each client, an original transaction with information indicative of at least one client which uses a document, of processing the original transaction as a global transaction to produce a document object, and transmitting, to the at least one client, the global transaction as a local transaction.

BRIEF DESCRIPTION OF THE DRAWING

FIGS. 11A through 11F collectively shows a format of various objects for use in the distributed system illustrated in FIG. 10;

DESCRIPTION OF THE PREFERRED EMBODIMENTS (Principles of the Invention)

Description will at first be directed to principles of this invention to facilitate an understanding of this invention.

Figure 1:
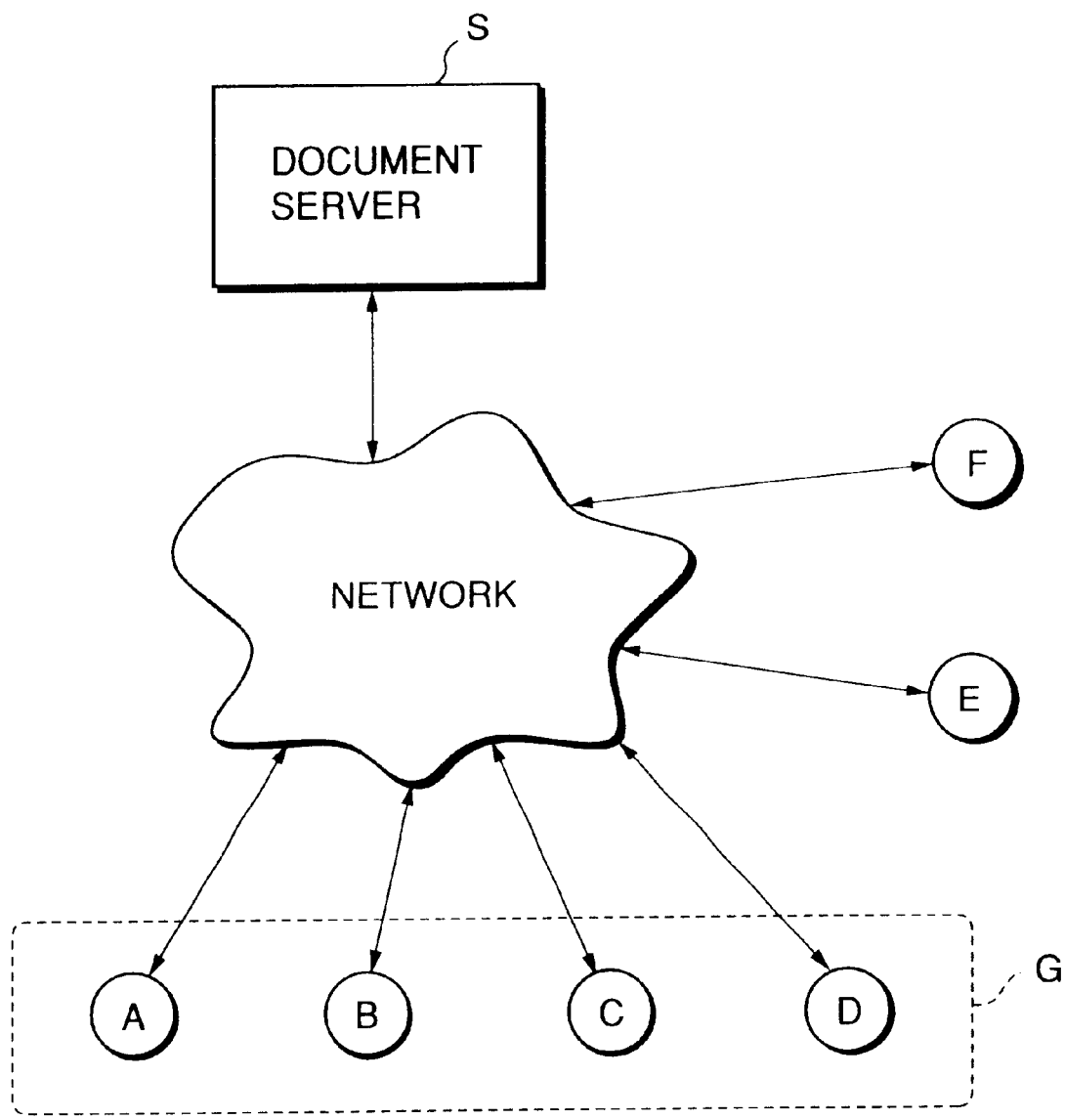
FIG. 1 is a block diagram of a distributed system for use in describing principles of the present invention.

Referring to FIG. 1, it will be assumed that a distributed processing system comprises a document server S and six clients which are connected to the document server S via a network. The six clients will be called first through sixth clients which are denoted by A, B, C, D, E, and F, respectively. As shown in FIG. 1, the first through the fourth clients A, B, C, and D compose one group enclosed with a broken line denoted by G. In the example being illustrated, the first through the fourth clients A to D share a document X illustrated in FIG. 2.

Figure 2:
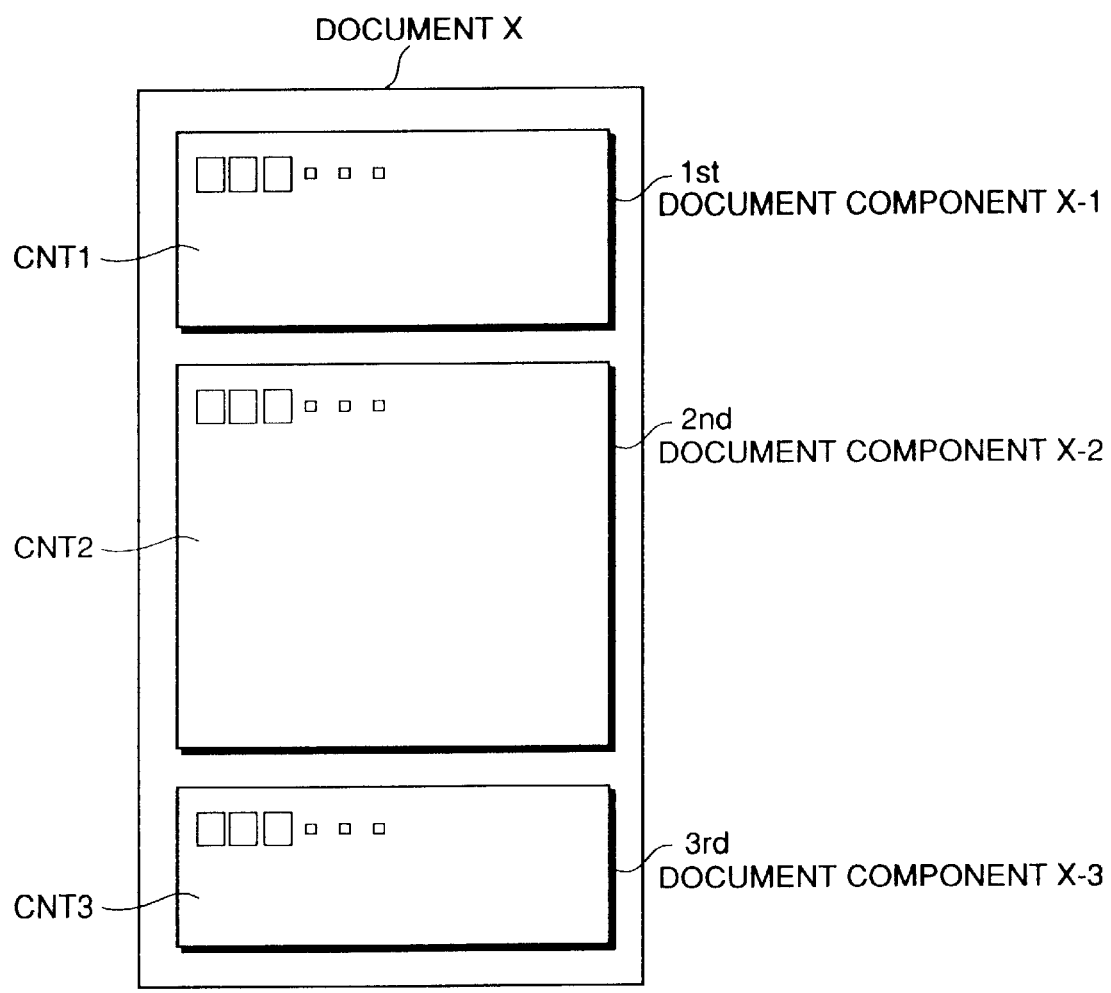
FIG. 2 shows a format of a document for use in describing the principles of the present invention.

Turning to FIG. 2, the document X is finally composed of three document components X-1, X-2, and X-3 which are called first through third document components, respectively. It will be assumed that all of the first through the fourth clients A to D composing the group G can see the first and the second document components X-1 and X-2 while the first and the second clients A and B alone can see the third document component X-3. In addition, it will be presumed that the first and the third document components X-1 and X-3 are generated by the first client A while the second document component X-2 is generated by the second client B.

Figure 3:
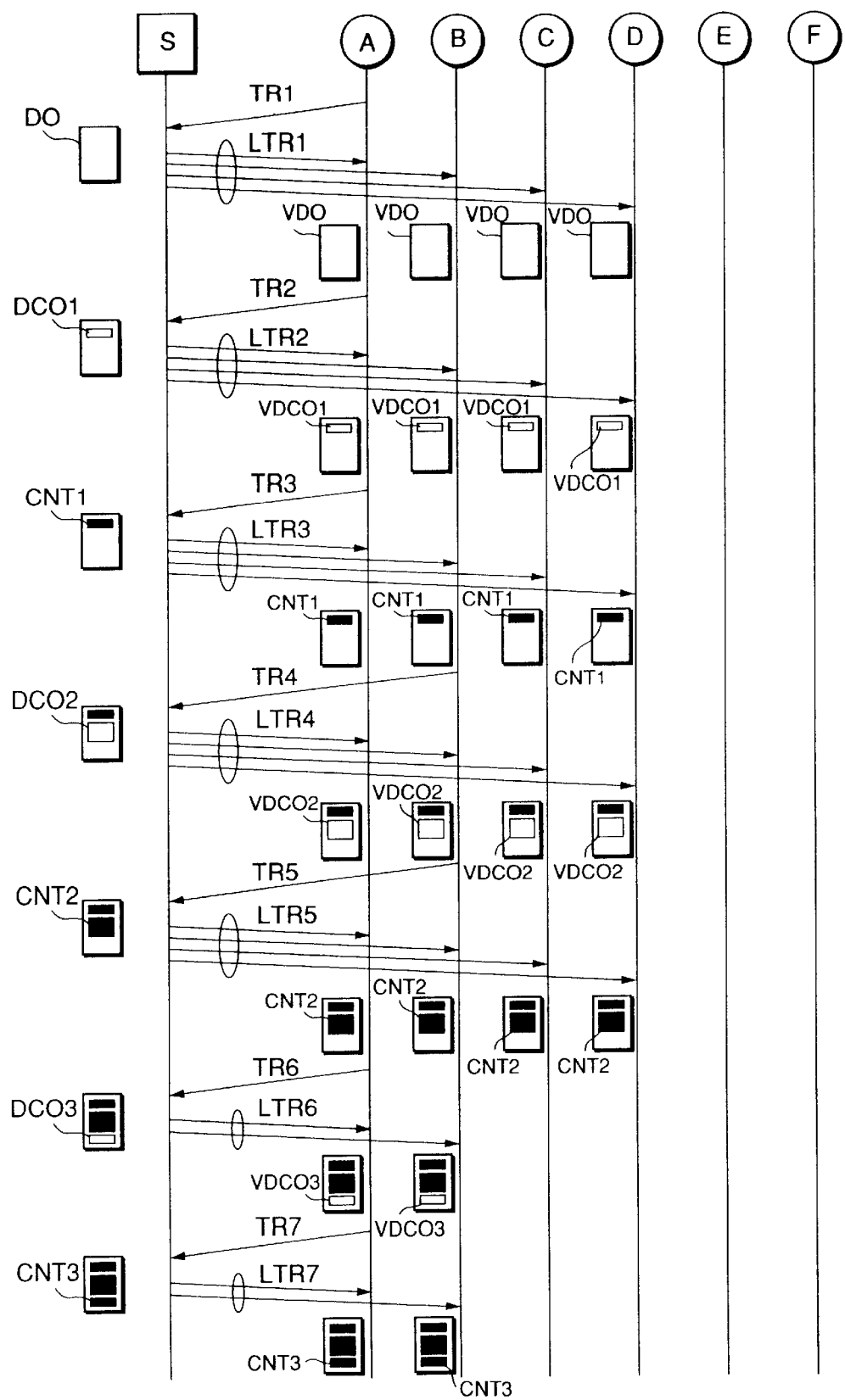
FIG. 3 is a sequence chart for use in describing the principles of the present invention.

Under the circumstances, until the document X finally comprises the first through the first document components X-1 to X-3 as illustrated in FIG. 2, transfer of transactions is carried out between the document server S and the first through the fourth clients A to D according to a sequence illustrated in FIG. 3.

Referring to FIGS. 1, 2, and 3, description will be made about a document X merely is an example and the document may comprise a plurality of document components which are nested.

It will be assumed that a generation operation for the document X is carried out by a user via an application program which operates on the first client A. Herein, the "generation operation" for the document X means an operation for generating a frame for the document X. The first client A is called a specific document generation client. In this event, the first client A produces a first transaction TR1 related to generation of the document X and transmits the first transaction TR1 to the document server S. The first transaction TR1 is called an original document generation transaction and designates an access attribute of the document X to be generated. The access attribute indicates that the document X is shared by the first through the fourth clients A to D composing the group G. The access attribute may be an identifier list indicative of identifiers for the first through the fourth clients A to D in which the document should be shared. In addition, the access attribute may be a group identifier for the group G when correspondence is preliminarily made between the group G and the first through the fourth clients A to D belonging thereto.

Herein, the "access attribute" is an attribute for designating an access right. The access attribute may be call an access control list as another name. In a simple example, the access right is represented by a flag (a truth/false value) indicative of one or more rights of, for example, readout, writing, and execution. It will assumed that the access attribute has a value which is 3 bits in length. Under the circumstances, for instance, the access attribute having the value of "100" means that the access right is composed of a readout right only. In addition, the access attribute having the value of "110" means that the access right is composed of not only the readout right but also a writing right. Furthermore, the access attribute having the value of "111" means that the access right is composed of the readout right, the writing right, and an execution right.

However, it is impossible to identify an owner of the access right on the basis of such a simple value of the access attribute. It is therefore necessary to designate a person having the access right in blocks of the owners, other users, groups, and so on. Structure for designating it is generally called the access control list. For example, it will assumed that the access control list comprises <the owner, 111>, <the same group, 110>, and <others, 100>. In this event, the access control list means that the owner can do anything, the same group of the owner can a readout operation and a writing operation, and the others can the readout operation only. As another expression way, there is the access control list where a set of persons and the access rights is listed.

As described above, in the present invention, it is assumed that the access attribute has a field for storing the above-mentioned access control list. In addition, the access right may indicate limitation of rights for detailed operations in dependency on an application program, such as shiftable (modifiable to a layout location in a document), enlargeable (modifiable to size) as well as the readout, the writing, and the execution. At any rate, in the present invention, the access attribute means information indicative of at least one client which uses the document.

The document server S receives the first transaction TR1 and processes the first transaction TR1 as a global document generation transaction to produce a document object DO for the document X thereon. The produced document object DO includes a unique document identifier assigned to the document X, the access attribute designated by the first client A, a pointer to document structure data, and so on. The pointer to the document structure data has an initial value of "NULL". Simultaneously, the document server S transmits, as a first local transaction LTR1, the global document generation transaction to the first through the fourth clients A to D which correspond to the access attribute designated by the first transaction TR1 or the global document generation transaction. The first local transaction LTR1 is called a local document generation transaction.

Each of the first through the fourth client A to D receives the first local transaction LTR1 and performs the first local transaction LTR1 to produce a virtual document object VDO corresponding to the document object DO generated in the document server S. The produced virtual document object VDO includes a document identifier, the access attribute, a pointer to document structure data, and so on. The pointer to the document structure data has the initial value of "NULL". Each of the first through the fourth client A to D returns the virtual document object VDO to an application program thereof.

Subsequently, it will be assumed that a generation operation for the first document component X-1 is carried out with regard to the virtual document object VDO of the document X by a user via the application program of the first client A. Herein, the "generation operation" for the first document component X-1 means an operation for generating a frame for the first document component X-1. In addition, the first document component X-1 is called a particular document component. Furthermore, the first client A is called a specific document component generation client. In this event, the first client A produces a second transaction TR2 related to generation of the fist document X-1 and transmits the second transaction TR2 to the document server S. The second transaction TR2 is called a first original document component generation transaction and designates an access attribute of the first document component X-1 to be generated. The access attribute indicates that the first document component X-1 is shared by the first through the fourth clients A to D composing the group G.

The document server S receives the second transaction TR2 and processes the second transaction TR2 as a first global document component generation transaction to produce a first document component object DCO1 for the first document component X-1 thereon. The produced first document component object DCO1 includes a first document component identifier for uniquely identifying the first document component X-1, the access attribute, a pointer to document structure data for the first document component X-1, and so on. The pointer to the data of the first document component X-1 has an initial value of "NULL". In addition, in this event, the document server produces, as the document structure data for the document X, data indicating that the document X comprises the first document component X-1 and therefore links it to the pointer to the document structure data for the document object DO. Simultaneously, the document server S transmits, as a second local transaction LTR2, the first global document component generation transaction to the first through the fourth clients A to D which correspond to the access attribute designated by the second transaction TR2 or the first global document component generation transaction. The second local transaction LTR2 is called a first local document component generation transaction.

Each of the first through the fourth client A to D receives the second local transaction LTR2 and performs the second local transaction LTR2 to produce a first virtual document component object VDCO1 corresponding to the first document component object DCO1 generated in the document server S thereon. The produced first virtual document component object VDCO1 includes a document component identifier, the access attribute, a pointer to data for the first document component X-1, and so on. The pointer to the data for the first document component X-1 has the initial value of "NULL". In addition, in this event, each of the first through the fourth client A to D produces, as the document structure data for the document X, data indicating that the document X comprises the first document component X-1 and therefore links it to the pointer to the document structure data for the first virtual document component object VDCO1. Each of the first through the fourth clients A to D returns the first virtual document component object VDCO1 to an application program thereof.

Subsequently, it will be assumed that an editing operation for the first document component X-1 is carried out by a user via the application program of the first client A. Herein, the "editing operation" for the first document component X-1 means an operation for preparing first edited data CNT1 indicative of contents of the first document component X-1 that are, for example, a text, an image, and so on. In addition, the first client A is called a specific editing client. In this event, the first client A produces a third transaction TR3 related to editing of the first document X-1 and transmits the third transaction TR3 to the document server S. The third transaction TR3 is called a first original editing transaction and designates an access attribute of the first document component X-1 to be edited. The access attribute indicates that the first document component X-1 is shared by the first through the fourth clients A to D composing the group G.

The document server S receives the third transaction TR3 and processes the third transaction TR3 as a first global editing transaction to carry out processing for preparing the first edited data CNT1 indicative of the contents of the first document component X-1 such as the text on the document server S. Specifically, the document server S carried out generation, modification, and so on of data for the first virtual document component object VDCO1 of the first document component X-1. Simultaneously, the document server S transmits, as a third local transaction LTR3, the first global editing transaction to the first through the fourth clients A to D which correspond to the access attribute relating to the first document component X-1. The third local transaction LTR3 is called a first local editing transaction.

Each of the first through the fourth client A to D receives the third local transaction LTR3 and performs the third local transaction LTR3 to prepare the first edited data CNT1 indicative of the contents of the first document component X-1 such as the text. Each of the first through the fourth clients A to D returns the first edited data CNT1 to an application program thereof. Prepared in the manner as described above, the contents of the first document component X-1 are displayed on a display unit (not shown) of each of the first through the fourth clients A to D. Thus, all of users for the first through the fourth clients A to D can see the same first edited data DNT1.

Although the first client A carried out both of the generation operation and the editing operation for the first document component X-1 in the example being illustrated, the first client A may carry out only the generation operation for the first document component X-1 while another client except for the first client A, for example, the second client B may carry out the editing operation for the first document component X-1. However, any client except for the first client A cannot carry out the editing operation for the first document component X-1 if an access right is set such that the first client A alone carries out the editing operation for first document component X-1 on generation of the first document component X-1.

In the illustrated distributed system, any client may edit in a case of generation of the first document component X-1. As a result, the second client B may edit or delete the first document component X-1. On the other hand, after generation of the first document component X-1, if the first client A sets, as the access right for the first document component X-1, a condition such that other clients except for the first client A cannot modify the first document component X-1, the other clients are put into a state so as to merely see the first document component X-1.

Although the access right of the generation operation for a document component is fixedly set to enable any client to modify the document component, it is possible to limit an editing and/or deleting operation for the document component to the client carrying out the generation operation for the document component if setting of the access right is interactively carried out by a user thereof on the generation operation in the manner which is described above.

Subsequently, it will be assumed that a generation operation for the second document component X-2 is carried out with regard to the virtual document object VDO of the document X by a user via the application program of the second client B. Herein, the "generation operation" for the second document component X-2 means an operation for generating a frame for the second document component X-2. In addition, the second document component X-2 is called the particular document component. Furthermore, the second client B is called the specific document component generation client. In this event, the second client B produces a fourth transaction TR4 related to generation of the second document component X-2 and transmits the fourth transaction TR4 to the document server S. The fourth transaction TR4 is called a second original document component generation transaction and designates an access attribute of the second document component X-2 to be generated. The access attribute indicates that the second document component X-2 is shared by the first through the fourth clients A to D composing the group G.

The document server S receives the fourth transaction TR4 and processes the fourth transaction TR4 as a second global document component generation transaction to produce a second document component object DCO2 for the second document component X-2 thereon. The produced second document component object DCO2 includes a second document component identifier for uniquely identifying the second document component X-2, the access attribute, a pointer to document structure data for the second document component X-2, and so on. The pointer to the data of the second document component X-2 has the initial value of "NULL". In addition, in this event, the document server S produces, as the document structure data for the document X, data indicating that the document X comprises the second document component X-2 and therefore links it to the pointer to the document structure data for the document object DO. Simultaneously, the document server S transmits, as a fourth local transaction LTR4, the second global document component generation transaction to the first through the fourth clients A to D which correspond to the access attribute designated by the fourth transaction TR4 or the second global document component generation transaction. The fourth local transaction LTR4 is called a second local document component generation transaction.

Each of the first through the fourth clients A to D receives the fourth local transaction LTR4 and performs the fourth local transaction LTR4 to produce a second virtual document component object VDCO2 corresponding to the second document component object DCO2 generated in the document server S thereon. The produced second virtual document compoent object VDCO2 includes a document component identifier, the access attribute, a pointer to data for the second document component X-2, and so on. The pointer to the data for the second document component X-2 has the initial value of "NULL". In addition, in this event, each of the first through the fourth clients A to D produces, as the document structure data for the document X, data indicating that the document X comprises the second document component X-2 and therefore links it to the pointer to the document structure data for the second virtual document component object VDCO2. Each of the first through the fourth clients A to D returns the second virtual document component object VDCO2 to an application program thereof.

Subsequently, it will be assumed that an editing operation for the second document component X-2 is carried out by a user via the application program of the second client B. Herein, the "editing operation" for the second document component X-2 means an operation for preparing second edited data CNT2 indicative of contents of the second document component X-2 that are, for example, a text, an image, and so on. In addition, the second client B is called the specific editing client. In this event, the second client B produces a fifth transaction TR5 related to editing of the second document component X-2 and transmits the fifth transaction TR5 to the document server S. The fifth transaction TR5 is called a second original editing transaction and designates an access attribute of the second document component X-2 to be edited. The access attribute indicates that the second document component X-2 is shared by the first through the fourth clients A to D composing the group G.

The document server S receives the fifth transaction TR5 and processes the fifth transaction TR5 as a second global editing transaction to carry out processing for preparing the second edited data CNT2 indicative of the contents of the second document component X-2 such as the text on the document server S. Specifically, the document server S carries out generation, modification, and so on of data for the second virtual document component object VDCO2 of the second document component X-2. Simultaneously, the document server S transmits, as a fifth local transaction LTR5, the second global editing transaction to the first through the fourth clients A to D which correspond to the access attribute relating to the second document component X-2. The fifth local transaction LTR5 is called a second local editing transaction.

Each of the first through the fourth clients A to D receives the fifth local transaction LTR5 and performs the fifth local transaction LTR5 to prepare the second edited data CNT2 indicative of the contents of the second document component X-2 such as the text. Each of the first through the fourth clients A to D returns the second edited data CNT2 to an application program thereof. Prepared in the manner as described above, the contents of the second document component X-2 are displayed on the display unit of each of the first through the fourth clients A to D. Thus, all of users for the first through the fourth clients A to D can see the same second edited data CNT2.

Subsequently, it will be assumed that a generation operation for the third document component X-3 is carried out with regard to the virtual document object VDO of the document X by a user via the application program of the first client A in order to prepare third data CTN3. Herein, the "generation operation" for the third document component X-3 means an operation for generating a frame for the third document component X-3. In addition, the third document component X-3 is called the particular document component. Furthermore, the first client A is called the specific document component generation client.

It will be presumed that the third document component X-3 is shared by the first and the second clients A and B alone and therefore the third and the fourth clients C and D cannot see the third document component X-3. In this event, the first client A produces a sixth transaction TR6 related to generation of the third document X-3 and transmits the sixth transaction TR6 to the document server S. The sixth transaction TR6 is called a third original document component generation transaction and designates an access attribute of the third document component X-3 to be generated. The access attribute indicates that the third document component X-3 is shared by the first and the second clients A and B alone.

The document server S receives the sixth transaction TR6 and processes the sixth transaction TR6 as a third global document component generation transaction to produce a third document component object DCO3 for the third document component X-3 thereon. The produced third document component object DCO3 includes a third document component identifier for uniquely identifying the third document component X-3, the access attribute, a pointer to document structure data for the third document component X-3, and so on. The pointer to the data of the third document component X-3 has the initial value of "NULL". In addition, in this event, the document server S produces, as the document structure data for the document X, data indicating that the document X comprises the third document component X-3 and therefore links it to the pointer to the document structure data for the document object DO. Simultaneously, the document server S transmits, as a sixth local transaction LTR6, the third global document component generation transaction to the first and the second clients A and B which correspond to the access attribute designated by the sixth transaction TR4 or the third global document component generation transaction. The sixth local transaction LTR6 is called a third local document component generation transaction.

Each of the first and the second clients A and B receives the sixth local transaction LTR6 and performs the sixth local transaction LTR6 to produce a third virtual document component object VDCO3 corresponding to the third document component object DCO3 generated in the document server S thereon. The produced third virtual document component object VDCO3 includes a document component identifier, the access attribute, a pointer to data for the third document component X-3, and so on. The pointer to the data for the third document component X-3 has the initial value of "NULL". In addition, in this event, each of the first and the second clients A and B produces, as the document structure data for the document X, data indicating that the document X comprises the third document component X-3 and therefore links it to the pointer to the document structure data for the third virtual document component object VDCO3. Each of the first and the second clients A and B returns the third virtual document component object VDCO3 to an application program thereof.

Subsequently, it will be assumed that an editing operation for the third document component X-3 is carried out by a user via the application program of the first client A. Herein, the "editing operation" for the third document component X-3 means an operation for preparing third edited data CNT3 indicative of contents of the third document component X-3 that are, for example, a text, an image, and so on. In addition, the first client A is called the specific editing client. In this event, the first client A produces a seventh transaction TR7 related to editing of the third document component X-3 and transmits the seventh transaction TR7 to the document server S. The seventh transaction TR7 is called a third original editing transaction and designates an access attribute of the third document component X-3 to be edited. The access attribute indicates that the third document component X-3 is shared by the first and the second clients A and B alone.

The document server S receives the seventh transaction TR7 and processes the seventh transaction TR7 as a third global editing transaction to carry out processing for preparing the edited third data CNT3 indicative of the contents of the third document component X-3 such as the text on the document server S. Specifically, the document server S carries out generation, modification, and so on of data for the third virtual document component object VDCO3 of the third document component X-3. Simultaneously, the document server S transmits, as a seventh local transaction LTR7, the third global editing transaction to the first and the second clients A and B which correspond to the access attribute relating to the third document component X-3. The seventh local transaction LTR7 is called a third local editing transaction.

Each of the first and the second clients A and B receives the seventh local transaction LTR7 and performs the seventh local transaction LTR7 to prepare the third edited data CNT3 indicative of the contents of the third document component X-3 such as the text. Each of the first and the second clients A and B returns the third edited data CNT3 to an application program thereof. Prepared in the manner as described above, the contents of the third document component X-3 are displayed on the display unit of each of the first and the second clients A and B. Thus, users for the first and the second clients A and B only can see the same third edited data CNT3.

Figure 4A:
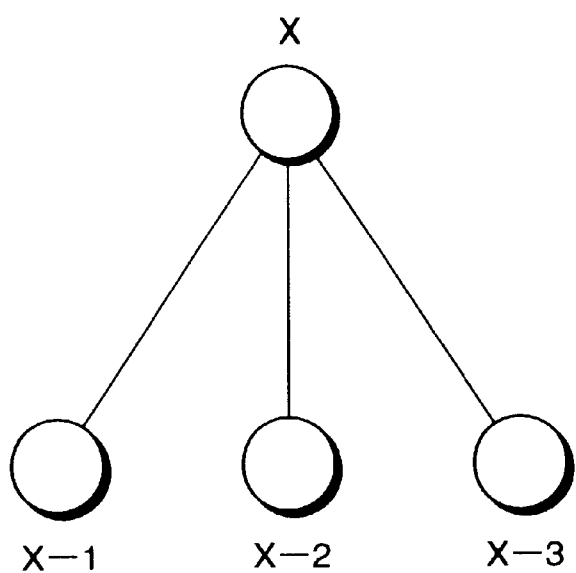
FIGS. 4A and 4B collectively show an example of document structure data for use in describing the principles of the present invention.
Figure 4B:
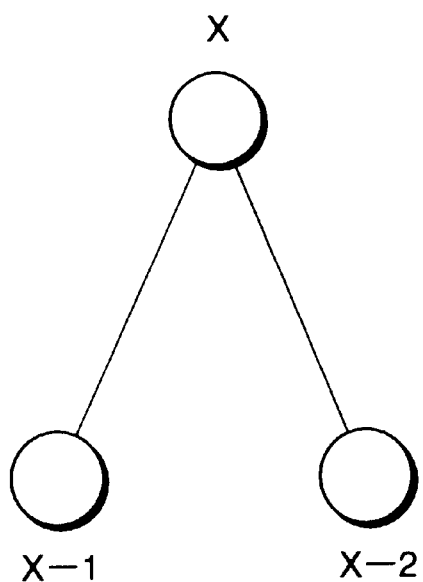

In the above-mentioned process, the fifth and the sixth clients E and F cannot see the contents of the document X. This is because no transaction is transmitted to the fifth and the sixth clients E and F each of which does not belong to the group G. Specifically, by carrying out the sequence illustrated in FIG. 3, document structure data illustrated in FIG. 4A is generated in the first and the second clients A and B as the virtual document object related to the document X and therefore the document X consisting of the first through the third document components X-1, X-2, and X-3 is displayed on a screen of each of the first and the second clients A and B. In addition, document structure data illustrated in FIG. 4B is generated in the third and the fourth clients C and D as the virtual document object related to the document X and therefore the document X consisting of the first and the second document components X-1 and X-2 is displayed on a screen of each of the third and the fourth clients C and D and the third document component X-3 is not displayed on the screen thereof. Furthermore, the contents of the document X are not displayed on a screen of each of the fifth and the sixth clients E and F at all because the virtual document objects related to the document X are not generated in the fifth and the sixth clients E and F at all.

Although the distributed system according to the present invention basically comprises the structure as described above, the distributed system according to the present invention may be additionally modified into various other types as follows.

Figure 5:
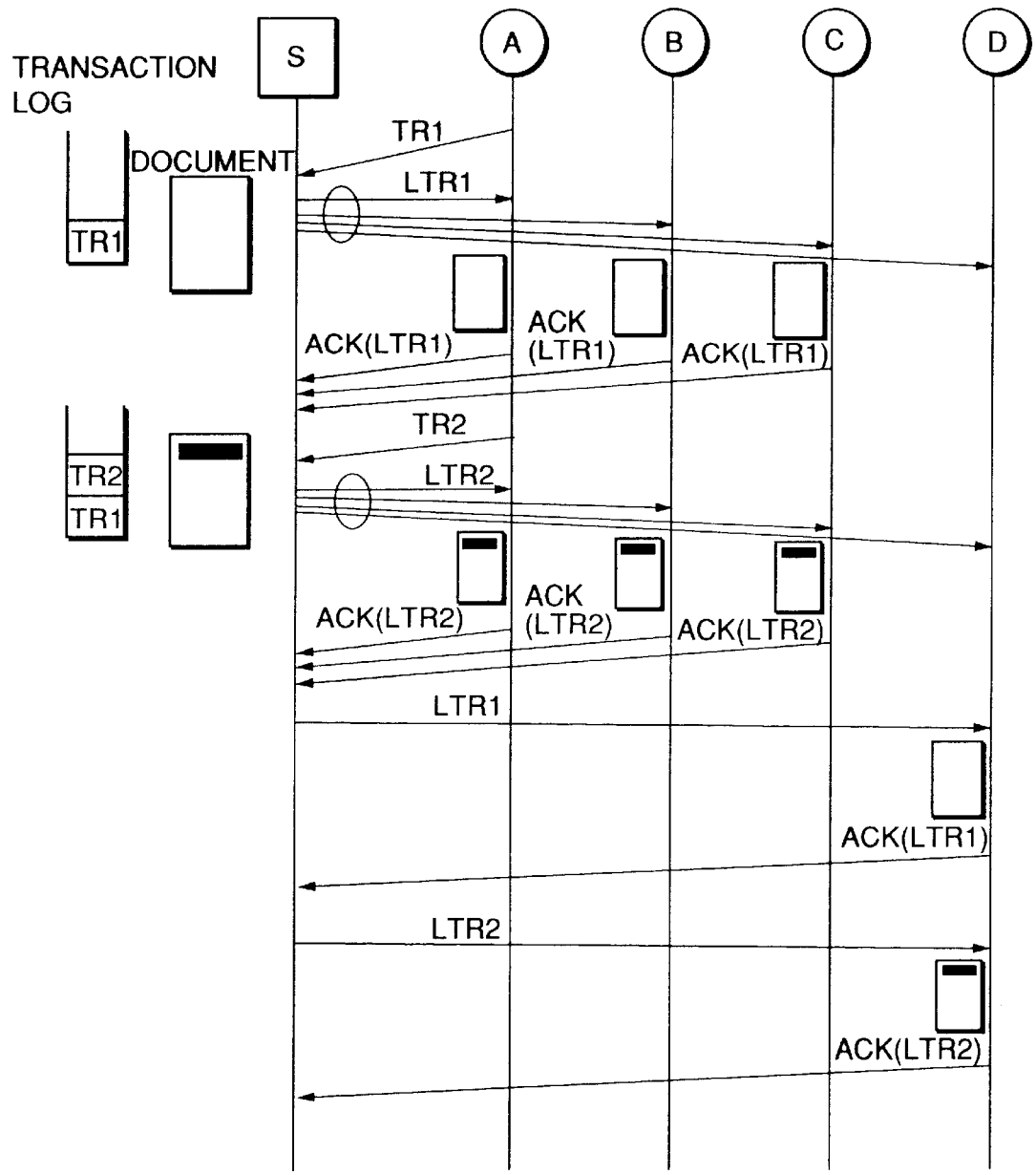
FIG. 5 is another sequence chart for use in describing the principles of the present invention.

Referring to FIG. 5, the document server S may store the global transactions as stored global transactions. When the document server S does not obtain an acknowledgement of the local transactions from any client, the document server S retrys transmission of the stored global transactions to the client in question. For example, in the example illustrated in FIG. 5, it will be assumed that the document server S does not obtain the acknowledgement ACK (LTR1) and ACK (LTI2) of the first and the second local transactions LTR1 and LTR2 from the fourth client C because of breakdown of the fourth client C or disconnection of the fourth client C from the network. Under the circumstances, when restarting of the fourth client C or connection of the fourth client C to the network enables the document server S to communicate with the fourth client C, the document server S transmits the first and the second local transactions LTR1 and LTR2 to the fourth client C again in this order. As a result, it is possible to surely transmit the local transactions from the document server S to any client related to the local transactions with time and failure overcome.

Figure 6:
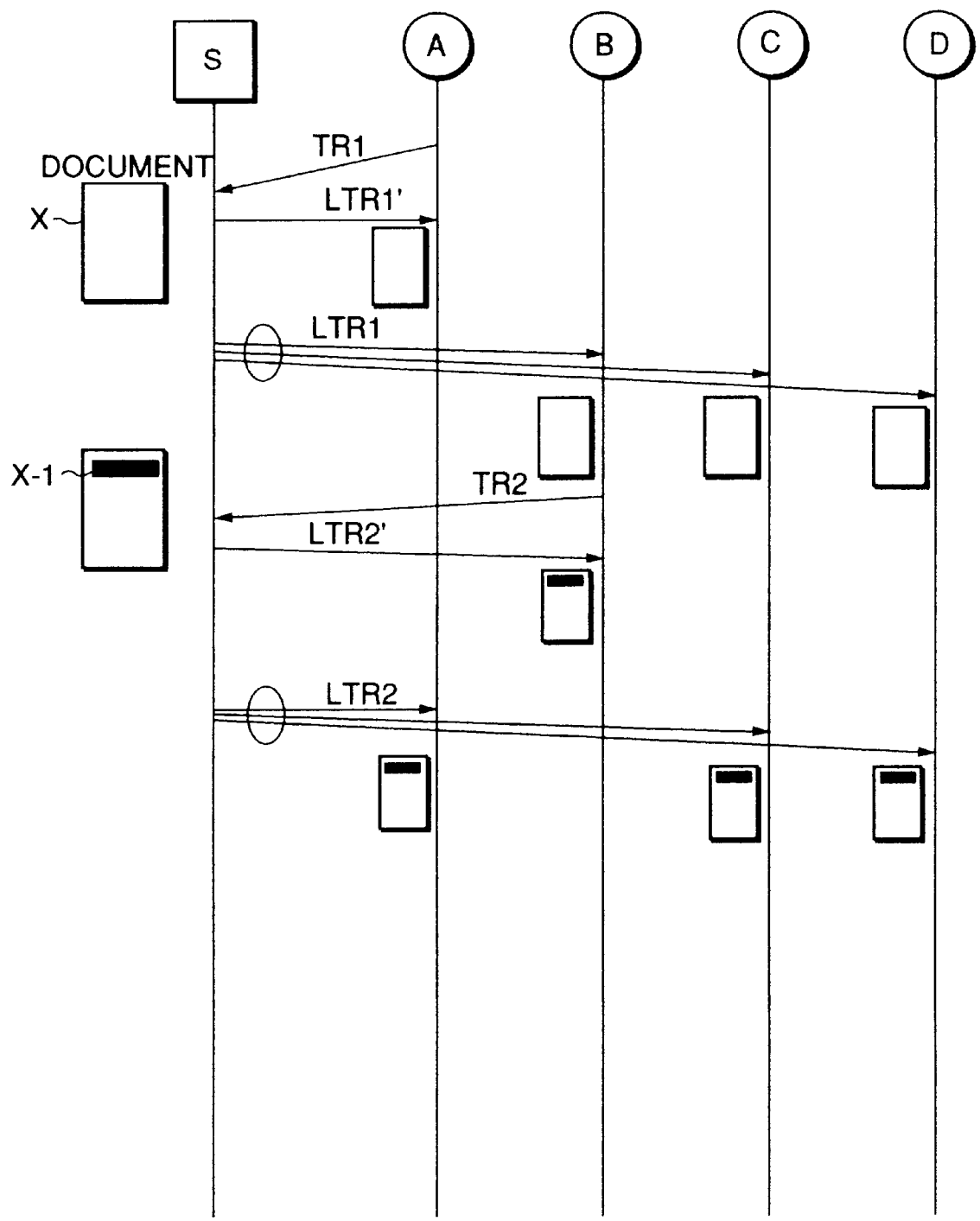
FIG. 6 is still another sequence chart for use in describing the principles of the present invention.

Referring to FIG. 6, each client may store the original transaction which is transmitted to the document server S. In this event, on transmission of the local transaction, the document server S transmits a part of data elements of the local transaction that includes data peculiar to the document server S alone to the client transmitting the original transaction without the transmission of all data elements of the local transaction. In the example illustrated in FIG. 6, the first client A stores the first transactions TR1 while the second client B stores a second transaction TR2. When the document server S transmits the first local transaction LTR1, the document server S transmits data LTR1' peculiar to the document server S such as an identifier number of the transaction to the first client A. This is because the first client A stores the first transaction TR1 for the document X. Similarly, when the document server S transmit the second local transaction LTR2, the document server S transmits the data LTR2' peculiar to the document server S to the second client B. This is because the second client B stores the second transaction TR2 for the first document component X-1. As a result, it is possible to cut transmission amounts of necessary data and therefore to restrain a load of the network.

Figure 7:
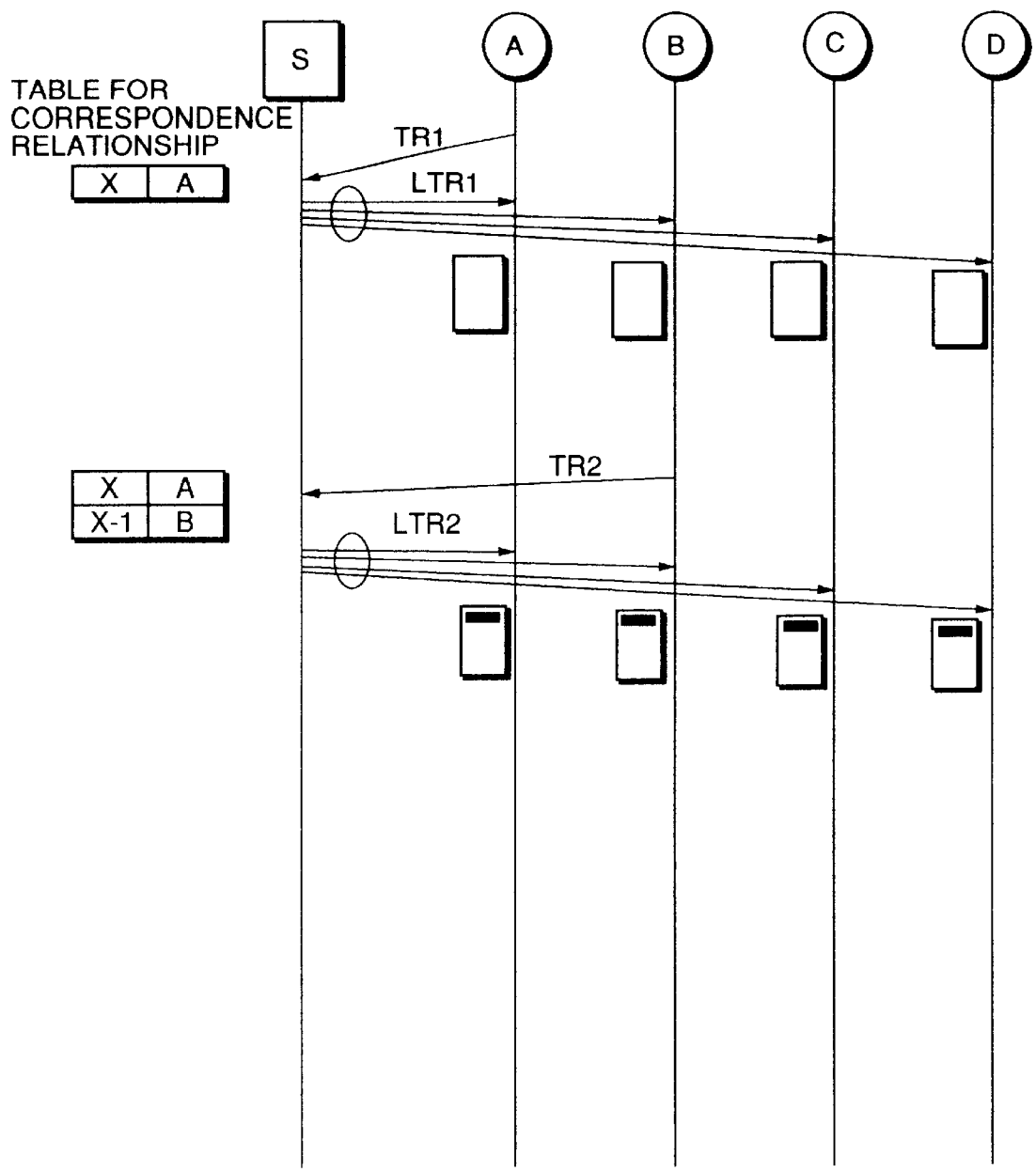
FIG. 7 is yet another sequence chart for use in describing the principles of the present invention.

Referring to FIG. 7, each client may hold the latest edited contents. In this event, on processing the global editing transaction for a document component, the document server S holds a table indicative of a correspondence relationship between an identifier of the document component and the client holding the latest edited contents without holding the latest edited contents. In the example being illustrated in FIG. 3, the document server S also holds the contents of the first through the third document components X-1 to X-3. This purpose is to enable reusing of the document X by holding the document X in the document server S. That is, it is possible for each of the first through the fourth clients A to D to display the document X prepared in the past again by reading final contents of the document X out of the document server S afterward. In this event, a method of holding the contents of the first through the third document components X-1 to X-3 in the document server S is the method described in conjunction with FIG. 3 while a method of holding the contents of the document X in the first client A and of holding the contents of the first document component X-1 in the second client B is a modification pointed out here as illustrated in FIG. 2. In the modification, on reusing of the document X, it is necessary for the document server S to carry out the procedures of investigating the correspondence relationship between the identifiers of the first through the third document components X-1 to X-3 and the first and the second clients A and B holding the latest edited contents thereof of obtaining the latest edited contents of the corresponding client, and of transmitting it to the client which reuses the document X. However, the modification is advantageous in that it is possible to cut a necessary storage capacity for the document server S in comparison with a case where the document server S collectively supervises all of the first through the third document components X-1 to X-3.

Figure 8:
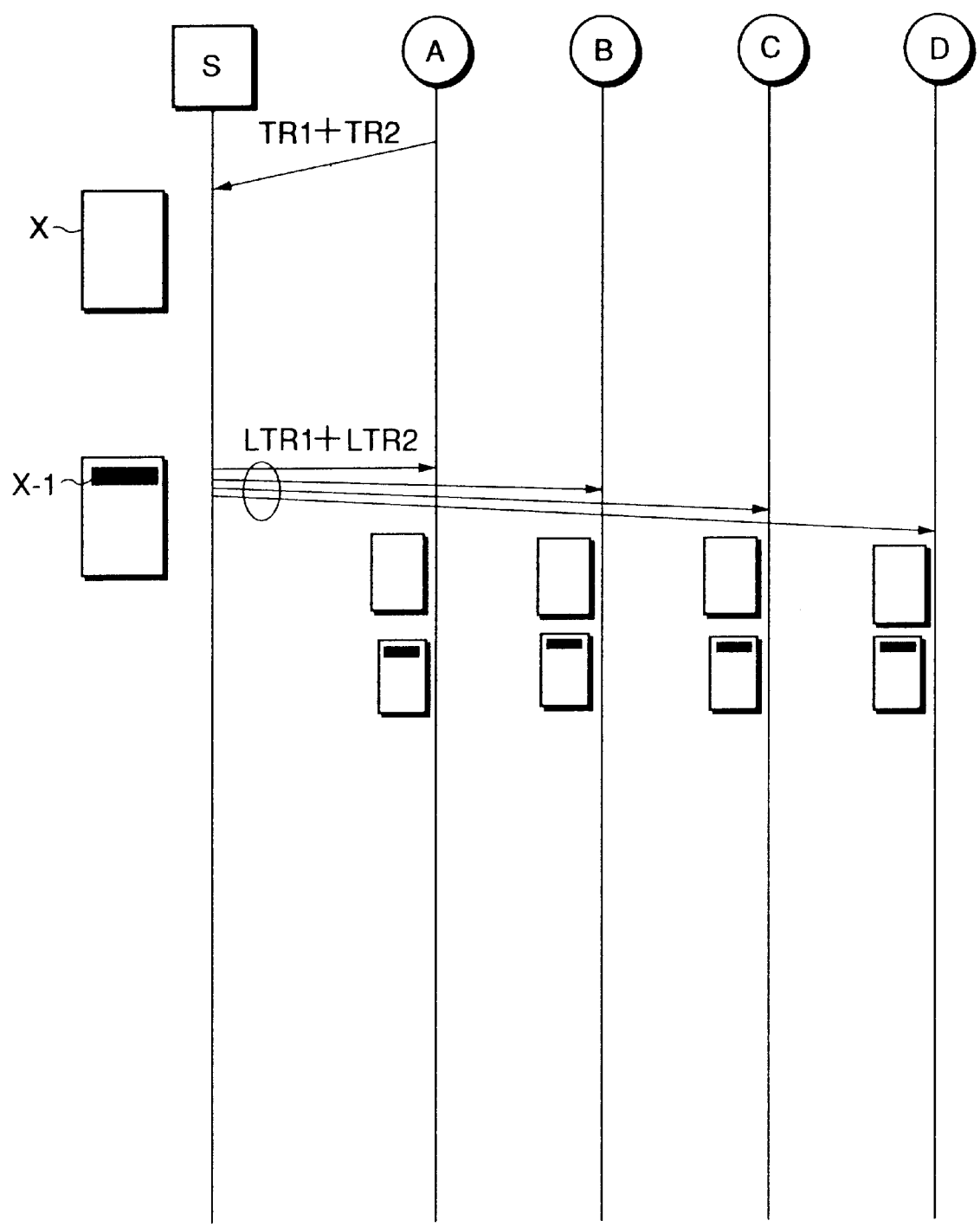
FIG. 8 is a further sequence chart for use in describing the principles of the present invention.

Referring to FIG. 8, on transmitting any transaction to the document server S, each client may collectively transmit a set of transactions related in a sense to each other as a collected transaction. For example, in the example being illustrated in FIG. 8, the first client A may transmit, as a collected original transaction (TR1+TR2), a set of the first transaction TR1 related to generation of the document X and the second transaction TR2 related to generation of the first document component X-1. The second client B may transmit, as another collected original transaction, a set of the fourth transaction TR4 related to generation of the second document component X-2 and the fifth transaction TR5 related to editing of the second document component x-2 generated while the first client A may transmit, as a still another collected original transaction, a set of the sixth transaction TR6 related to generation of the third document component X-3 and the seventh transaction TR7 related to editing of the third document component X-3 generated. By doing in such a manner, it is possible for an application program to perform a large significant unit of transaction.

Figure 9:
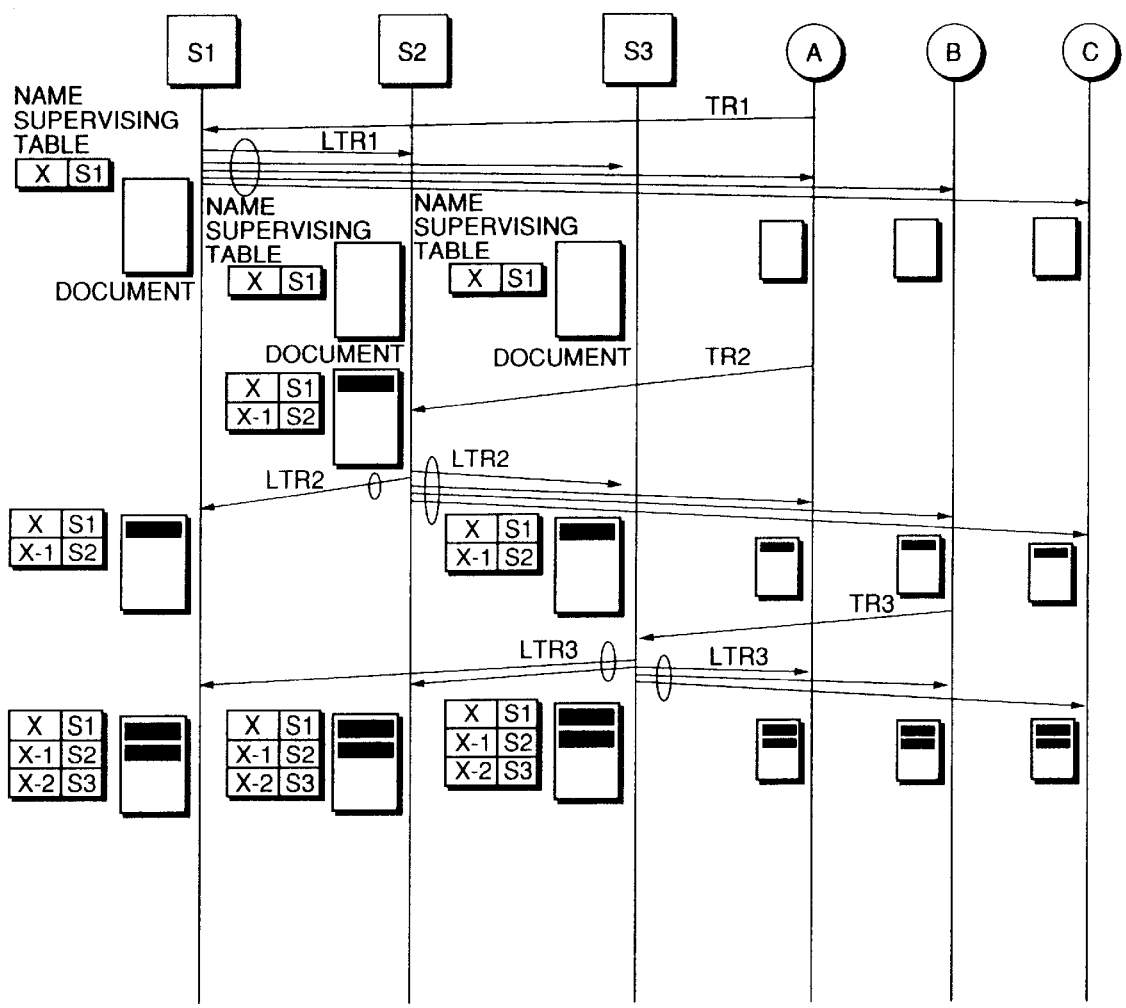
FIG. 9 is a still further sequence chart for use in describing the principles of the present invention.

Referring to FIG. 9, another distributed system according to this invention may comprise a plurality of document servers each of which has a function for dispersively supervising names of the identifiers so as to supervise the document by the plurality of document servers. With this structure, it is possible to distribute the load of each document server.

In the example illustrated in FIG. 9, the distributed system comprises first through third document servers S1, S2, and S3 and first through third clients A, B, and C which are connected to the first though the third document servers S1 to S3 via a network (not shown). Each of the first through the third document servers S1 to S3 comprises a name supervising table. The first client A transmits a first transaction TR1 related to generation of a document x to the first document server S1. The first document server S1 stores a first supervised name in the name supervising table thereof. The first supervised name consists of a document identifier for identifying the document X and a first server identifier for identifying the first document server S1. The first document server S1 transmits a first local transaction LTR1 to the second and the third document servers S2 and S3 and the first through the third clients A to C. In this event, each of the second and the third document servers S2 and S3 stores the first supervised name in the name supervising table thereof.

Subsequently, the first client A transmits a second transaction TR2 related to generation of a first document component X-1 to the second document server S2. The second document server S2 stores a second supervised name in the name supervising table thereof. The second supervised name consists of a first document component identifier for identifying the first document component X-1 and a second server identifier for identifying the second document server S2. The second document server S2 transmits a second local transaction LTR2 to the first and the third document servers S1 and S3 and the first through the third clients A to C. In this event, each of the first and the third document servers S1 and S3 stores the second supervised name in the name supervising table thereof.

Thereafter, the second client B transmits a third transaction TR3 related to generation of a second document component X-2 to the third document server S3. The third document server S3 stores a third supervised name in the name supervising table thereof. The third supervised name consists of a second document component identifier for identifying the second document component X-2 and a third server identifier for identifying the third document server S3. The third document server S3 transmits a third local transaction LTR3 to the first and the second document servers S1 and S2 and the first through the third clients A to C. In this event, each of the first and the second document servers S1 and S2 stores the third supervised name in the name supervising table thereof.

Embodiments

Figure 10:
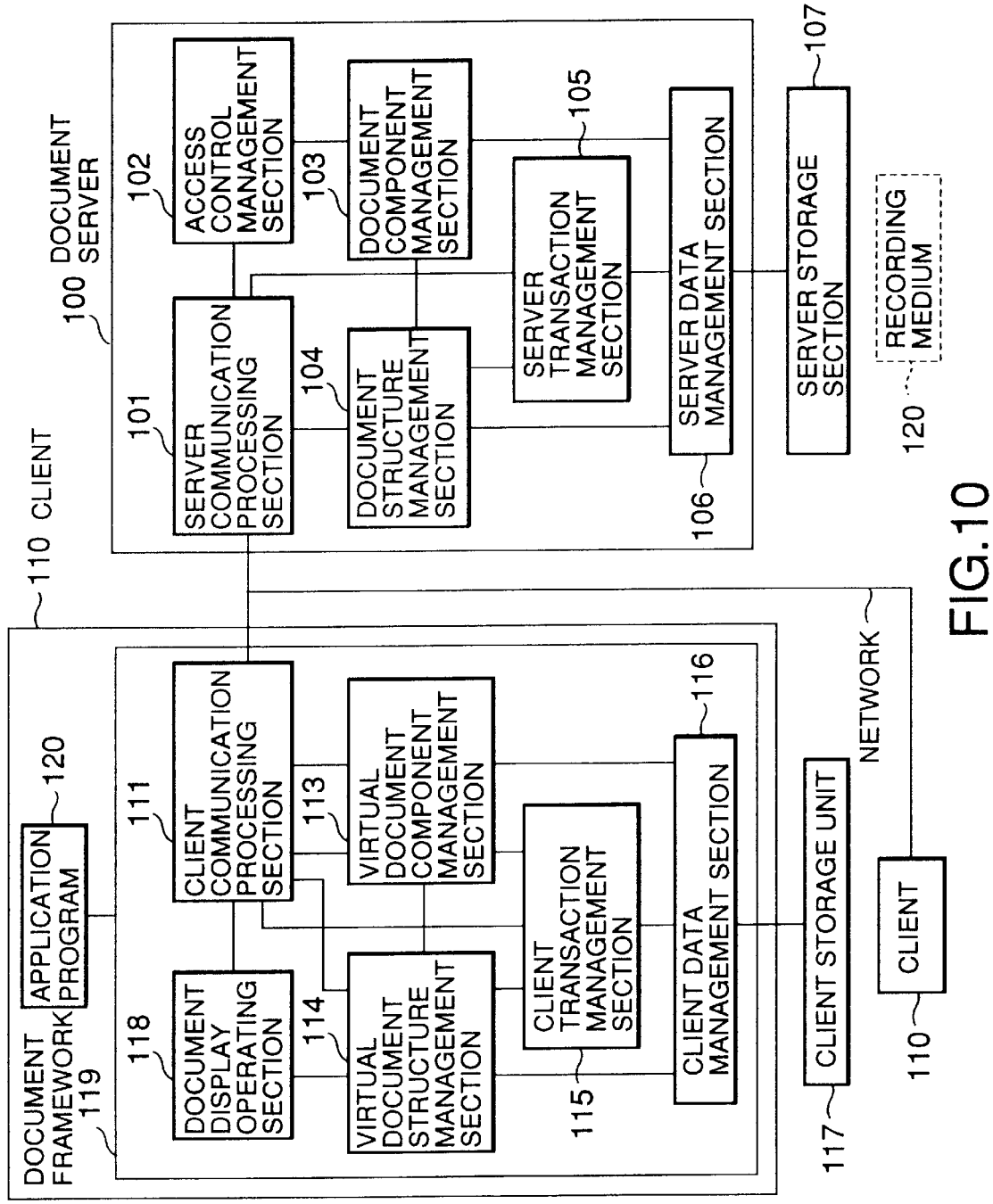
FIG. 10 is a block diagram of a distributed system according to a preferred embodiment of this invention.

Referring to FIG. 10, the description will proceed to a distributed system according to a preferred embodiment of this invention. The illustrated distributed system comprises a document server 100 and a plurality of clients 110 which are connected to the document server 100 via a network such as a local area network (LAN), a wide area network (WAN), or the like.

The document server 100 comprises a server communication processing section or a server communication processing module 101, an access control management section or an access control management module 102, a document component management section or a document component management module 103, a document structure management section or a document structure management module 104, a server transaction management section or a server transaction management module 105, and a server data management section or a server data management module 106. The document sever 100 is provided with a server storage unit 107. The server communication processing section 101 is connected to the clients 110 via the network and is connected to the access control management section 102, the document structure management section 104, and the server transaction management section 105. The access control management section 102 is connected to the server communication processing section 101 and the server data management section 105. The document component management section 103 is connected to the document structure management section 104, the server transaction management section 105, and the server data management section 106. The document structure management section 104 is connected to the server communication processing section 101, the document component management section 103, the server transaction management section 105, and the server data management section 106. The server transaction management section 105 is connected to the server communication processing section 101, the document component management section 103, the document structure management section 104, and the server data management section 106. The server data management section 106 is connected to the access control management section 102, the document component management section 103, the document structure management section 104, the server transaction management section 105, and the server storage unit 107.

Figure 11A:
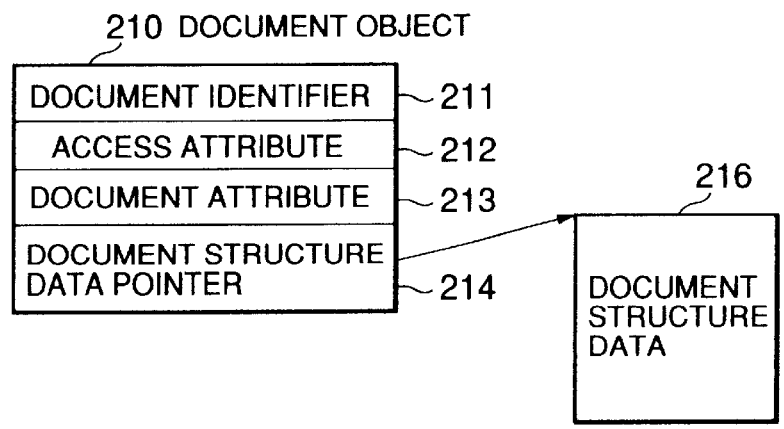

Referring to FIG. 11A in addition to FIG. 10, the document structure management section 104 is a section for managing structure of a document which is shared by the plurality of clients 110. FIG. 11A shows a structural example of an document object 210 which is used in a case where the document structure management section 104 manages structure of the document. As shown in FIG. 11A, the document object 210 comprises a document identifier 211 for uniquely identifying the document, an access attribute 212 for the document, a document attribute 213 of the document, and a document structure data pointer 214 for linking document structure data 216. In the example being illustrated, the document structure is a hyper-media structure which consists of document components each corresponding to a part of the document and a link indicative of relevance among the document components. In the document structure data 216, data of the link indicative of the relevance among the document components are held by using document component identifiers which are unique identification numbers assigned to the document components, individually. Data of individual components are managed by the document component management section 103. The document structure management section 104 stores the generated document object 210 and the document structure data 216 in the server storage unit 107 via the server data management section 106 and reads data out of the server storage unit 107 to renew it if necessary.

Figure 11B:
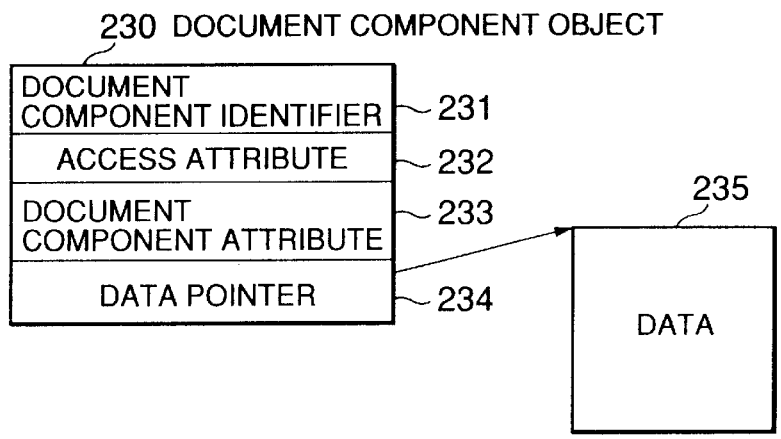

Referring to FIG. 11B in addition to FIG. 10, the document component management section 103 is a section for managing the individual document components composing the document. FIG. 11B shows a structural example of a document component object 230 used in a case where the document component management section 103 manages a document component. As shown in FIG. 11B, the document component object 230 comprises a document component identifier 231 for uniquely identifying the document component, an access attribute 232 for the document component, a document component attribute 233 of the document component, and a data pointer 234 for linking data 235 which are contents of the document component. The document component management section 103 stores the generated document component object 230 and the data 235 in the server storage unit 107 via the server data management section 106 and reads data out of the server storage unit 107 to renew it if necessary.

Figure 11C:
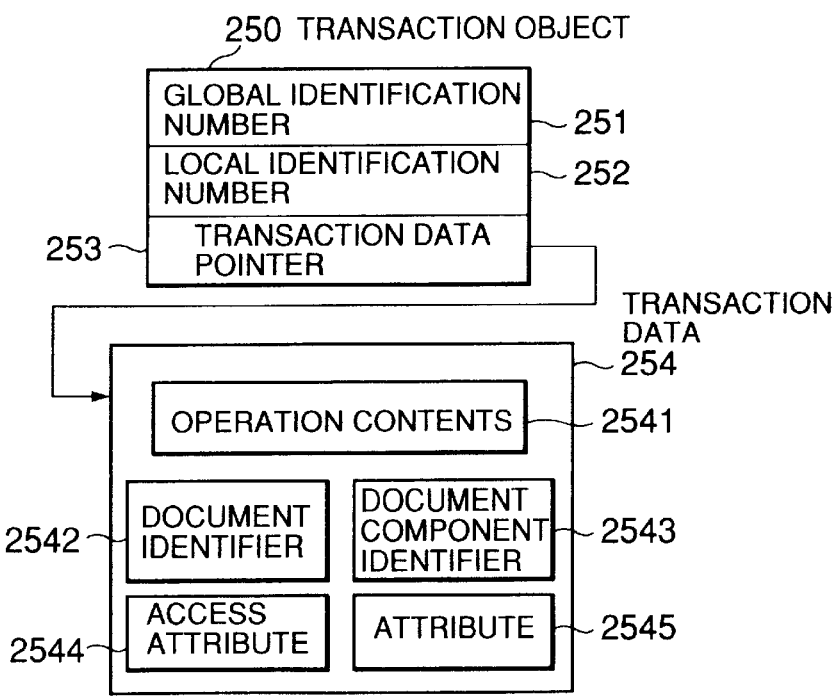

Referring to FIG. 11C in addition to FIG. 10, the server transaction management section 105 is a section for generally managing transactions for the document server 100. FIG. 11C shows a structural example of a transaction object 250 used in a case where the server transaction management section 105 manages a transaction. As shown in FIG. 11C, the transaction object 250 comprises a global identification number 251 for uniquely identifying the transaction, a local identification number 252 for the transaction, a transaction data pointer 253 for linking transaction data 254. The transaction data 254 includes operation contents 2541 for the document or the document components, a document identifier 2542, a document component identifier 2543, an access attribute 2544, and an attribute 2545 for the document or the document components.

The access control management section 102 is a section for carrying out an access control on the basis of the access attribute for the document or the document components. That is, the access control management section 102 carries out processing for determining the client or the clients to which the document server 100 should transmit a local transaction or the like. The access control management section 102 may have a function for modifying the access attribute for the document of the document components already set in accordance with a request from the client which is a possessor of the document or the document components. In this event, a modification request is transmitted from the client 120 to the document server 100. The modification request includes an identifier for the document or the document component which is a modified object of the access attribute, a name of the possessor, and an access attribute after the modification. When the access control management section 102 receives the modification request via the server communication processing section 101, the access control management section 102 checks the access attribute in the object related to the document or the document component as the modified object and modifies the access attribute if the client 100 is a regular possessor.

The server data management section 106 is disposed between the server storage unit 107 and the document structure management section 104, the document component management section 103, the access control management section 102, and the server transaction management section 105. The server data management section 106 is a section for generally managing access to the server storage unit 107 by the document structure management section 104, the document component management section 103, the access control management section 102, and the server transaction management section 105.

The server communication processing section 101 is a section for enabling the document server 100 to mutually communicate with each client 110. On reception of a transaction from the each client 110, the server communication processing section 101 delivers the transaction to the server transaction management section 105. Supplied with a transmission request for a local transaction from the server transaction management section 105, the server communication processing section 101 obtains names of the clients to be transmitted from the access control management section 102 to transmit the local transaction to the clients. In addition, the server communication processing section 101 receives various requests from each client 110 and transmits replies for the requests or the like.

As shown in FIG. 10, each client 110 comprises a document framework 119 and an application program 120 which are connected to each other. The client 110 is provided with a client storage unit 117.

The document framework 119 is an application framework for encapsulating an access based on the document structure defined by the document server 100 by using an object oriented technique. The application program 120 is prepared using an object defined by the document framework 119. The document framework 119 comprises a client communication processing section or a client communication processing module 111, a document display operating section or a document display operating module 118, a virtual document component management section or a virtual document component management module 113, a virtual document structure management section or a virtual document structure management module 114, a client transaction management section or a client transaction management module 115, and a client data management section or a client data management module 116.

The client communication processing section 111 is connected to the document server 100 via the network and is connected to the document display operating section 118, the virtual document structure management section 114, the virtual document component management section 113, and the client transaction management section 115. The document display operating section 118 is connected to the client communication processing section 111 and the virtual document structure management section 114. The virtual document component management section 113 is connected to the client communication processing section 113, the virtual document structure management section 114, the client transaction management section 115, and the client data management section 116. The virtual document structure management section 114 is connected to the client communication processing section 111, the document display operating section 118, the virtual document component management section 113, the client transaction management section 115, and the client data management section 116. The client transaction management section 115 is connected to the client communication processing section 111, the virtual document component management section 113, the virtual document structure management section 114, and the client data management section 116. The client data management section 116 is connected to the virtual document component management section 113, the virtual document structure management section 114, the client transaction management section 115, and the client storage unit 117.

The document display operating section 118 converts display of the document and operation for the document of a user into instructions for the virtual document structure management section 114. In addition, the document display operating section 118 plays a role is making the display of the document change in accordance with an event transmitted via the client communication processing section 111. The event is, for example, an event indicative of arrival of a renewal message for data.

Referring to FIG. 11D in addition to FIG. 10, the virtual document structure management section 114 is a section for managing structure of a virtual document where the client 100 can virtually see in the document managed in the document server 100. FIG. 11D shows a structural example of a virtual document object 220 which is used in a case where the virtual document structure management section 114 manages structure of the virtual document. As shown in FIG. 11D, the virtual document object 220 comprises a virtual document identifier 221 for uniquely identifying the virtual document, a virtual access attribute 222 for the virtual document, a virtual document attribute 223 of the virtual document, a virtual document structure data pointer 224 for linking virtual document structure data 226, and an access time instant 225. In the virtual document structure data 226, data related to the document components seen by the client alone are held in the document structure data 216 of the document in the document server 100 that corresponds to the virtual document in question. The virtual document structure management section 114 stores the generated virtual document object 210 and the virtual document structure data 226 in the client storage unit 117 via the client data management section 116 and reads data out of the client storage unit 117 to renew it if necessary.

In addition, an area for storing the virtual document structure data 226 is managed by the virtual document structure management section 114. When the area is utilized to the fullest, the virtual document structure management section 114 cancels, by referring to the access time instant 225, the virtual document structure data 226 for the virtual document object 220 related to the oldest access and release the area to use for storing new virtual document structure data 226. As a result, each client does not always hold the virtual document structure data 226 related to all of the document seen by the client in question but holds only the virtual document structure data 226 related to the document where the application program 120 recently reads and writes. If necessary virtual document structure data is not stored in the client storage unit 117, the virtual document structure management section 114 obtains it by making a request to the document server 100.

Referring to FIG. 11E in addition to FIG. 10, the virtual document component management section 113 is a section for managing virtual document components which can be virtually seen by the client 100 in question in the document components managed by the document server 100. FIG. 11E shows a structural example of a virtual document component object 240 used in a case where the virtual document component management section 113 manages a virtual document component. As shown in FIG. 11E, the virtual document component object 240 comprises a virtual document component identifier 241 for uniquely identifying the virtual document component, a virtual access attribute 242 for the virtual document component, a virtual document component attribute 243 of the virtual document component, a data pointer 244 for linking data 246 of the virtual document component, and an access time instant 245. The virtual document component management section 113 stores the generated virtual document component object 240 and the data 245 in the client storage unit 117 via the client data management section 106 and reads data out of the client storage unit 117 to renew it if necessary.

In addition, an area for storing the data 246 is managed by the virtual document component management section 113. When the area is utilized to the fullest, the virtual document component management section 113 cancels, by referring to the access time instant 245, the data 246 for the virtual document component object 240 related to the oldest access and release the area to use for storing data 246 for a new virtual document component. Specifically, each client 110 does not always hold the data 246 related to all of the document components seen by the client in question but holds only the data 246 related to the document components where the application program 120 recently reads and writes. If necessary data is not stored in the client storage unit 117, the virtual document component management section 113 obtains it by making a request to the document server 100.

Referring to FIG. 11F in addition to FIG. 10, the client transaction management section 115 is a section for generally managing the transactions for the document server 100. FIG. 11F shows a structural example of a transaction object 260 used in a case where the client transaction management section 115 manages a transaction. As shown in FIG. 11F, the transaction object 260 is similar in structure to the transaction object 250 illustrated in FIG. 11C. That is, the transaction object 260 comprises a global identification number 261 for uniquely identifying the transaction, a local identification number 262 for the transaction, a transaction data pointer 263 for linking transaction data 264. The transaction data 264 includes operation contents 2641 for the document or the document components, a document identifier 2642, a document component identifier 2643, an access attribute 2644, and an attribute 2645 for the document or the document components.

The client data management section 116 is disposed between the client storage unit 117 and the virtual document structure management section 114, the virtual document component management section 113, and the client transaction management section 115. The client data management section 116 is a section for generally managing access to the client storage unit 117 by the virtual document structure management section 114, the virtual document component management section 113, and the client transaction management section 115.

The client communication processing section 111 is a section for enabling the client 110 to mutually communicate with the document server 100. Supplied with a transmission request for a transaction from the client transaction management section 115, the client communication processing section 111 transmits the transaction to the document server 100. On reception of the local transaction from the document server 100, the client communication processing section 111 delivers the local transaction to the client transaction management section 115. In addition, the client communication processing section 111 receives and transmits other various requests or information from and to the document server 100.

In the above-mentioned embodiment, a flow of a basic operation is as follows. That is, responsive to a request for a document operation that is supplied from a user via the application program 120 of the client 110, the document framework 119 generates an original transaction and transmits the original transaction to the document server 100. When the document server 100 receives the transaction, the document server 100 performs the original transaction as a global transaction and transmits a local transaction to the clients 110 related to the global transaction. When the client receives the local transaction, the document framework 119 thereof performs the local transaction. Operation of each client 110 and the document server 100 of FIG. 10 will be described below in each individual case.

(1) Generation procedure of an original transaction in each client 110.

Figure 12:
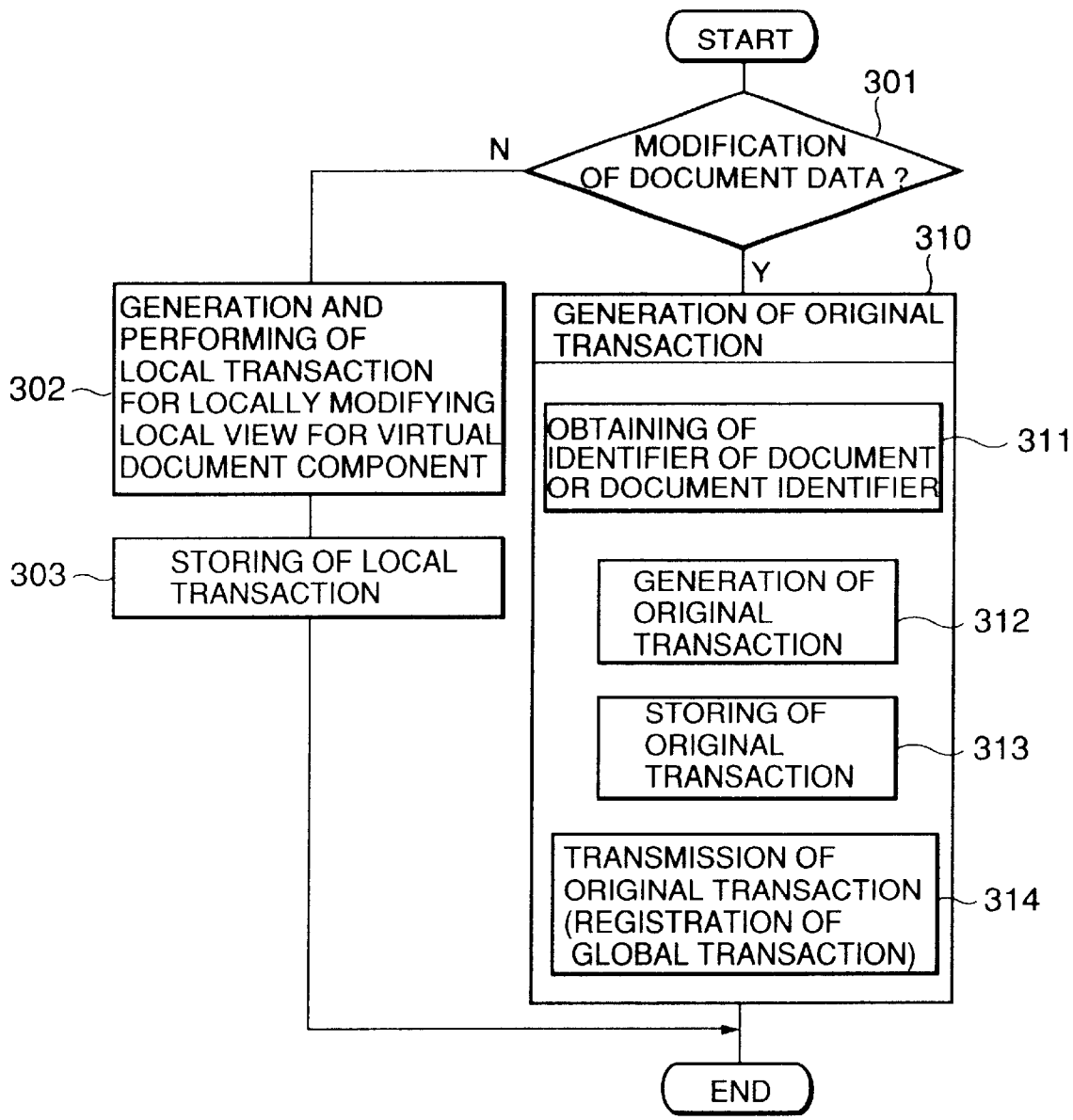
FIG. 12 is a flow chart for use in describing a generation operation of an original transaction in each client.

Referring to FIG. 12 in addition to FIG. 10, the description will proceed to operation of the generation procedure of the original transaction in each client 110. It will be assumed that any operation related to an document occurs in the application program 120 on the client 110 by a user. In this event, the document display operating section 118 of the document framework 119 converts the operation related to the document from the user into an instruction for the virtual document structure management section 114. Responsive to the instruction, the virtual document structure management section 114 interprets the instruction to determine whether the operation is an operation accompanied with modification of document data or not (step 301). The determining method may be a method of the steps of, preliminarily defining, as operations accompanied with the modification of document data, several operations in the application program 120, and of carrying out determination according to the definition. Such several operations are, for example, an operation for temporarily shifting a document component on a screen, a scaling operation, and so on.

It will be assumed that a current operation is accompanied with the modification of document data. In this event, the client transaction management section 115 carries out a generation processing of the original transaction related to the current operation (step 310). The generation processing (the step 310) of the original transaction carries out processing as follows.

It will be presumed that the current operation is an operation for newly generating a document. In this event, inasmuch as a document identifier does not exist at this point in time, a step 311 is skipped and the client transaction management section 115 generates, as the original transaction, a set of the transaction object 260 and the transaction data 264 illustrated in FIG. 11F (step 312). The transaction object 260 comprises the global identification number 261, the local identification number 262, and the transaction data pointer 263 in which a value of "NULL", a unique identification number, and a pointer to the transaction data 264 are set, respectively. Generated at this time, the transaction data 264 includes the operation contents 2641, the document identifier 2642, the document component identifier 2643, the access attribute 2644, and the document attribute 2645. The operation contents 2641 include an indication for generating a new document. The value of "NULL" is set in each of the document identifier 2642 and the document component identifier 2643. The access attribute 2644 is designated by the user separately on the operation of the document generation. The document attribute 2645 is, for example, a title of the new document or the like.

The access attribute 2644 may be an identifier list indicative of all of identifiers for the clients which share the newly generated document. In addition, when the clients compose a group and when a relationship between the group and the clients composing the group is managed separately, the access attribute 2644 may be an identifier for specifying the group. Furthermore, other than them, the access attribute 2644 may include a possessor of the document and an access limitation of each client to be shared. For example, the access limitation may be a limitation so as to allow referring only, a limitation so as to allow both of referring and renewing, or the like.

The step 312 proceeds to a step 313 at which the client transaction management section 115 stores the generated original transaction in the client storage unit 117 via the client data management section 116 as a log. The step 313 is followed by a step 314 at which the client transaction management section 115 transmits the original transaction to the document server 100 through the client communication processing section 111 in order to make the document server 100 register the original transaction as a global transaction.

It will be presumed that the current operation is an operation for newly generating a component document in the document which is already generated. In this event, the client transaction management section 115 obtains, from the virtual document structure management section 114, the identifier of the document which is the operation object as the step 311. The step 311 is succeeded by the step 312 at which the client transaction management section 115 generates, as the original transaction, a set of the transaction object 260 and the transaction data 264 illustrated in FIG. 11F in the similar manner which is described above. The transaction data 264 includes the operation contents 2641, the document identifier 2642, the document component identifier 2643, the access attribute 2644, and the attribute 2645. The operation contents 2641 include an indication for generating a new document component. The document component identifier 2643 has the value of "NULL". The access attribute 2644 is designated by the user separately on the generation operation of the document component. The attribute 2645 is, for example, a title of the new document component or the like.

In the similar manner which is described above on generation of the document, the access attribute 2644 may be an identifier list indicative of all of identifiers for the clients which share the newly generated document component. In addition, when the documents compose the group and when the relationship between the group and the clients composing the group is managed separately, the access attribute 2644 may be the identifier for specifying the group. In case of succeeding to the access attribute for the document, the access attribute 2644 may be an appointment of that effect. Furthermore, other than them, the access attribute 2644 may include a possessor of the document component and the access limitation of each client to be shared. For example, the access limitation may be a limitation so as to allow referring of the document component only, a limitation so as to allow both of referring and renewing of the document component, or the like.

The step 312 proceeds to the step 313 at which the client transaction management section 115 stores or saves the generated original transaction in the client storage unit 117 via the client data management section 116 as a log. The step 313 is followed by the step 314 at which the client transaction management section 115 transmits the original transaction to the document server 100 through the client communication processing section 111 in order to make the document server 100 register the original transaction as the global transaction.

It will be presumed that the current operation is an operation for inputting data in the document component in the already generated document, modifying data which is already inputted, or the like. In this event, the client transaction management section 115 obtains the document identifier of the operation object and the document component identifier of the operation object from the virtual document structure management section 114 and virtual document component management section 113, respectively, at the step 311. The step 311 is succeeded by the step 312 at which the client transaction management section 115 generates, as the original transaction, a set of the transaction object 260 and the transaction data 264 in the similar manner which is described above. The transaction data 264 includes the operation contents 2641, the document identifier 2642, the document component identifier 2643, the access attribute 2644, and the attribute 2645. The operation contents 2641 include an indication for inputting the data in the document component or an indication for modifying the data. The step 312 proceeds to the step 313 at which the client transaction management section 115 stores the generated original transaction in the client storage unit 117 via the client data management section 116 as a log. The step 313 is followed by the step 314 at which the client transaction management section 115 transmits the original transaction to the document server 100 through the client communication processing section 111 in order to make the document server 100 register the original transaction as the global transaction.

It will be presumed that the current operation is an operation which is not accompanied with the modification of the document data. In this event, the step 301 is followed by a step 302 at which the client transaction management section 115 generates a local transaction related to the document component of the operation object and performs the local transaction. Under the circumstances, the document display operating section 118 modifies, via the virtual document structure management section 114, a local view for the client 110 in question. The step 302 proceeds to a step 303 at which the client transaction management section 115 stores or saves the local transaction in the client storage unit 117 via the client data management section 116. Inasmuch as the local transaction is stored in the manner as described above, it is possible to cancel the modification or to rerun a cancelled one.

(2) Processing of a global transaction in the document server 100.

Figure 13:
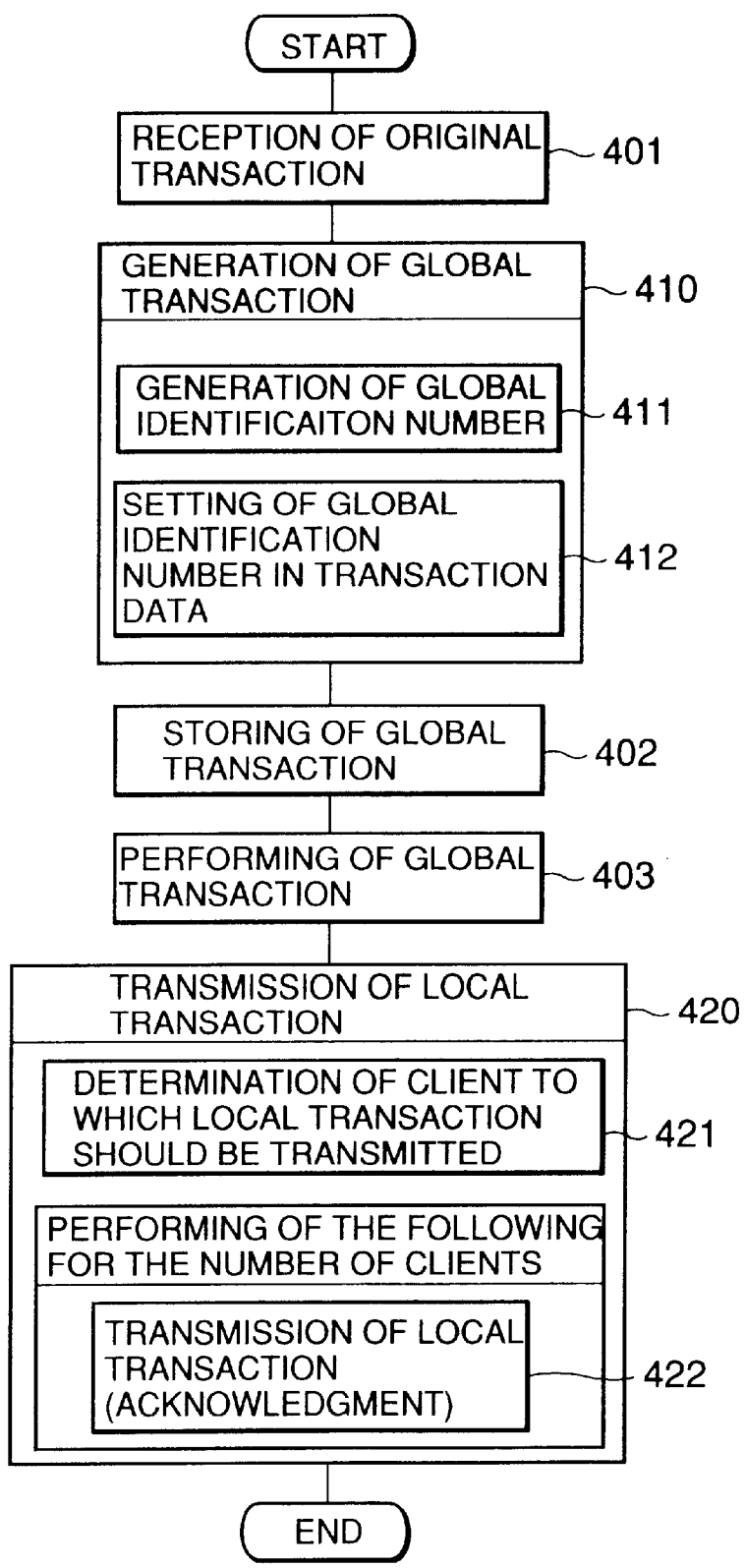
FIG. 13 is a flow chart for use in describing a processing operation of a global transaction in a document server.

Referring to FIG. 13 in addition to FIG. 10, the description will proceed to operation of processing of the global transaction in the document server 100. Transmitted from the client 110 via the network, the original transaction is received in the server communication processing section 101 of the document server 100 (step 401). The server communication processing section 101 delivers the original transaction to the server transaction management section 105. The step 401 proceeds to a step 410 at which the server transaction management section 105 generates a global transaction on the basis of the original transaction. In generation of the global transaction, the server transaction management section 105 first generates a unique global identification number (step 411). The step 411 is followed by a step 412 at which the server transaction management section 105 sets the unique global identification number in the global identification number in the transaction object of a received global transaction. Specifically, when the server communication processing section 101 receives the original transaction comprising the transaction object 260 and the transaction data 264 illustrated in FIG. 11F, the server transaction where the global identification number generated at the step 411 is set in the global identification number of the value of "NULL". Accordingly, the transaction data 264 and the local identification number 262 received are used as the transaction data 254 and the local identification number 252 as it is.

The step 410 is succeeded by a step 402 at which the server transaction management section 105 stores or saves the generated global transaction in the server storage unit 107 through the server data management section 106. The step 402 proceeds to a step 403 at which the server transaction management section 105 performs the global transaction.

Figure 14:
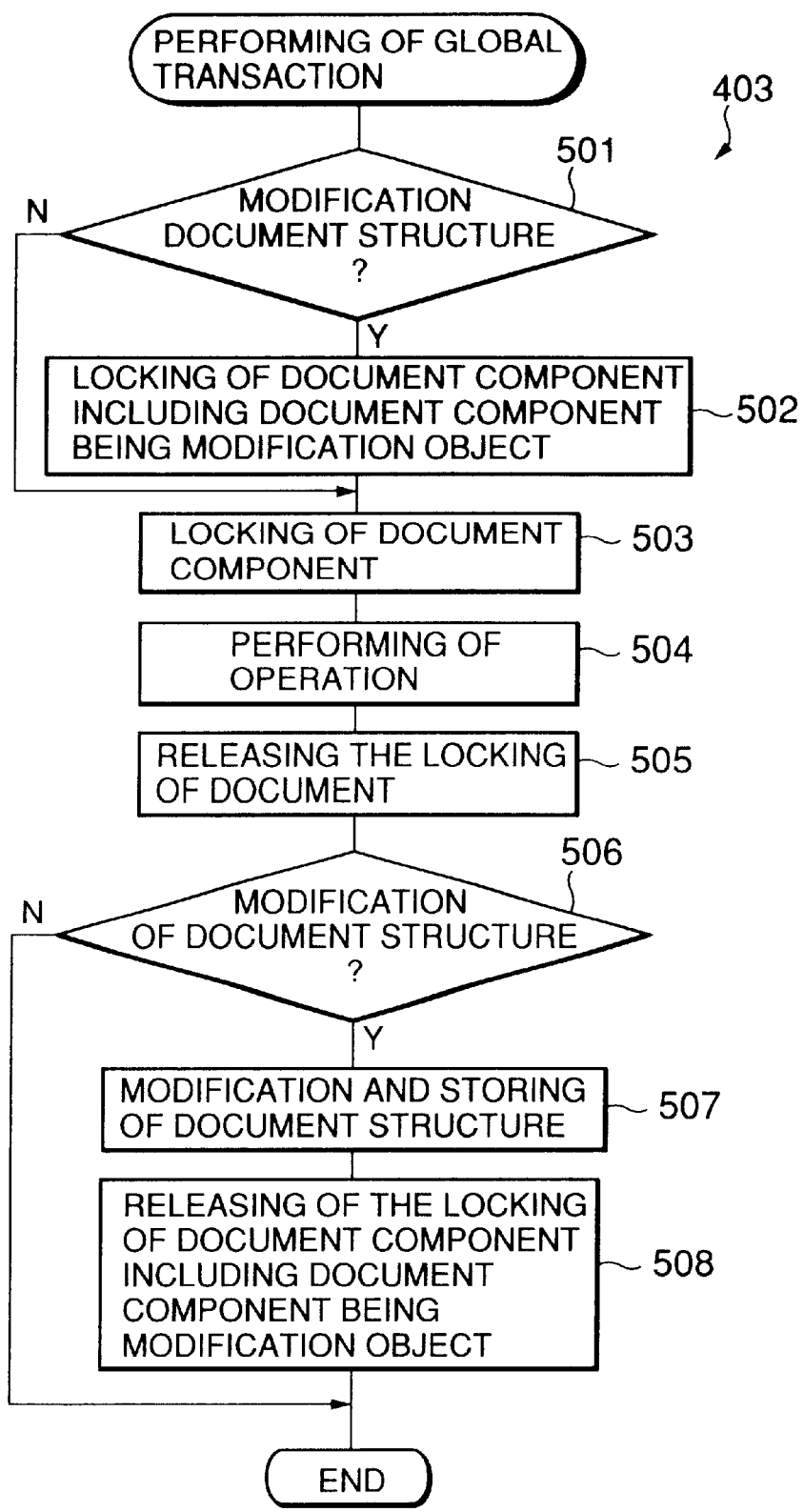
FIG. 14 is a flow chart for use in describing a performing operation of the global transaction which is carried out by a stop 403 of FIG. 13.

Turning to FIG. 14, the description will proceed to operation of a procedure of performing the global transaction that is carried out at the step 403.

The server transaction management section 105 determines first whether or not the global transaction is a transaction accompanied with modification of document structure (step 501). The transaction which is accompanied with the modification of the document structure is, for example, new generation of a document, new generation of a document component, deletion of the document, deletion of the document component, and so on. On the other hand, the transaction which is not accompanied with the modification of the document structure is, for example, inputting of data to the document component, modification of the data, and so on.

It will be assumed that the global transaction is the transaction accompanied with the modification of the document structure. In this event, the server transaction management section 105 retrieves, from the document structure data 216 (FIG. 11A) managed by the document structure management section 104, the document component including the document component which is directly the modification object by the transaction and locks it if it exists (step 502). For instance, when the global transaction is the transaction so as to prepare a new document component β in a document component α, the document component α is locked at the step 502. In addition, although the transaction for the new generation of the document is the transaction accompanied with the modification of the document structure, the step 502 is skipped. This is because the document component is not yet prepared.

Subsequently, the server transaction management section 105 locks the document component which is directly the modification object by the current transaction (step 503). However, when the current transaction is the transaction for the new generation of the document or the document component, the step 503 is skipped.

Thereafter, the server transaction management section 105 performs the operation related to the current transaction (step 504). It is assumed that the current transaction indicates an operation for inputting data in a document component in a document or an operation for modifying the data. In this event, the server transaction management section 105 performs, via the document component management section 103, processing of inputting the data 235 (FIG. 11B) in the document component in question or of modifying the data 235. In addition, it is assumed that the current transaction indicates an operation for deleting the document component. In this event, the server transaction management section 105 deletes the document component in question via the document component management section 103.

Figure 15:
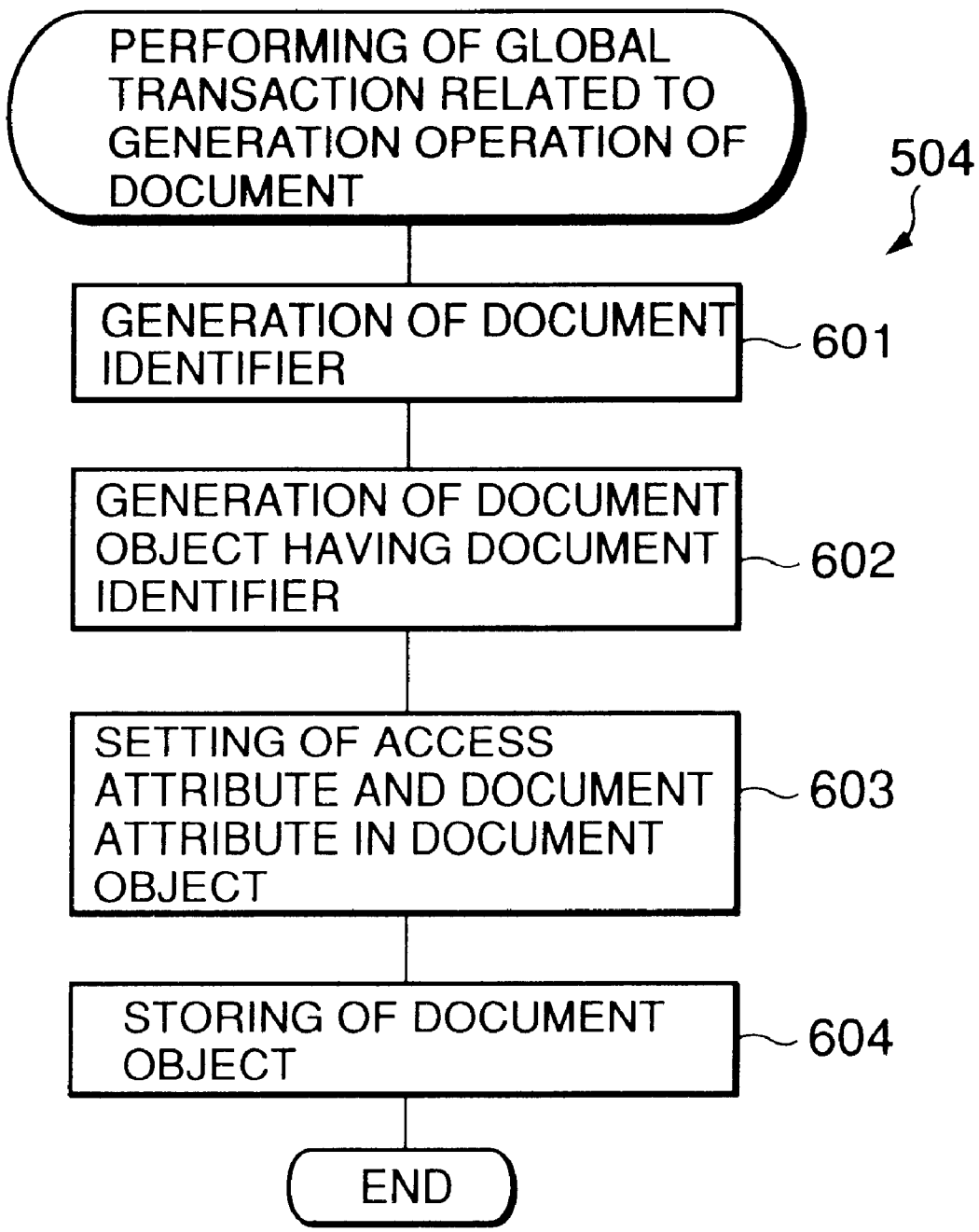
FIG. 15 is a flow chart for use in describing a processing operation at a step 504 of FIG. 14 in a case where the global transaction is related to a generation operation of the document.

Furthermore, when the current transaction indicates a generation operation of the document or a generation operation of the document component, the server transaction management section 105 performs processing according to them. FIG. 15 shows a processing example at the step 504 in a case where the global transaction relates to the generation operation of the document while FIG. 16 shows a processing example at the step 504 in another case where the global transaction relates to the generation operation of the document component.

Turning to FIG. 15, the description will proceed to operation of a procedure of performing the global transaction related to the generation operation of the document. The server transaction management section 105 passes control to the document structure management section 104. The document structure management section 104 first generates a document identifier which does not overlap with other documents managed by the document server 100 (step 601). The step 601 proceeds to a step 602 at which the document structure management section 104 generates a document object having the generated document identifier. The generated document object is the document object 210 (FIG. 11A) which comprises the document identifier 211 in which the generated document identifier is set, the access attribute 212 and the document attribute 213 each of which has a value of "NULL" at this point in time. In addition, the document structure management section 104 secures, in the server storage unit 107, a storage area such as a file for storing the document structure data 216 (FIG. 11A) and sets a pointer thereto in the document structure data pointer 214 (FIG. 11A). Subsequently, by referring to information included in the transaction data 254 (FIG. 11C) of the global transaction (the access attribute 2544 and the document attribute 2545 which are designated by the user separately on the generation operation of the document or the like), the document structure management section 104 sets the access attribute 212 and the document attribute 213 in the document object 210 generated at the step 602 (step 603). The step 603 is followed by a step 604 at which the document structure management section 104 stores or saves the document object 210 (FIG. 11A) in the server storage unit 107 through the server data management section 106 and returns control to the server transaction management section 105. Instead of setting the access attribute 2544 designated by the user in the access attribute 212 of the document object 210 directly, the access control management section 102 may generate a correspondence table which consists of the document identifier, the access attribute for the document indicated by the document identifier, and the user or the group to store the correspondence table in the server storage unit 107 and may set an index of the correspondence table in the access attribute 212 of the document object 210.

Figure 16:
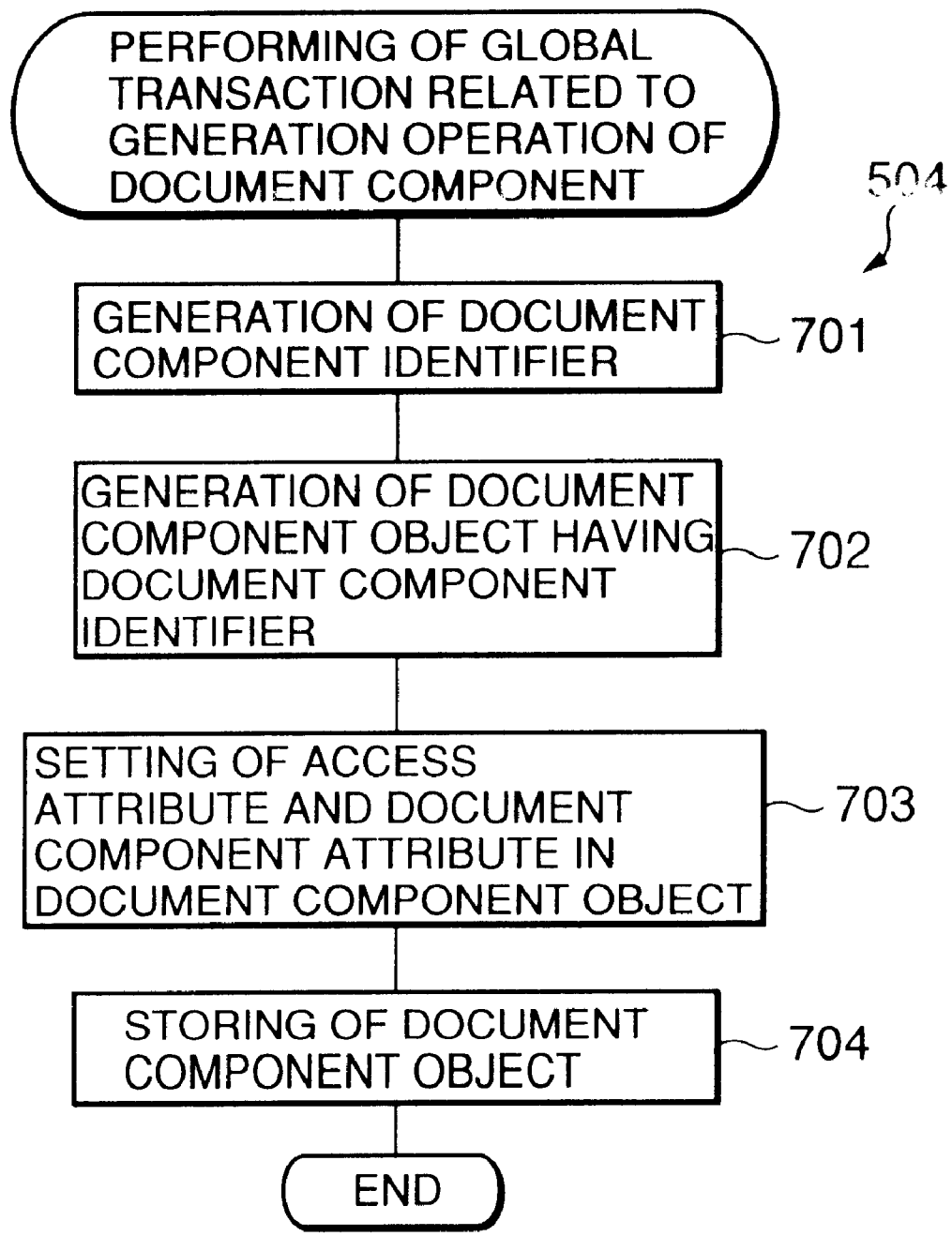
FIG. 16 is a flow chart for use in describing a processing operation at a step 504 of FIG. 14 in another case where the global transaction is related to a generation operation of a document component.

Turning to FIG. 16, the description will proceed to operation of a procedure of performing the global transaction related to the generation operation of the document component. The server transaction management section 105 passes control to the document component management section 103. The document component management section 103 first generates a document component identifier which does not overlap with other document components managed by the document server 100 (step 701). The step 701 proceeds to a step 702 at which the document component management section 103 generates a document component object having the generated document component identifier. The generated document component object is the document component object 230 (FIG. 11B) which comprises the document component identifier 231 in which the generated document component identifier is set, the access attribute 232 and the document component attribute 233 each of which has a value of "NULL" at this point in time. In addition, the document component management section 103 secures, in the server storage unit 107, a storage area such as a file for storing the data 235 (FIG. 11B) of the document component and sets a pointer thereto in the data pointer 234 (FIG. 11B). Subsequently, by referring to information included in the transaction data 254 (FIG. 11C) of the global transaction (the access attributes 2544 and the document component attribute 2545 which are designated by the user separately on the generation operation of the document component or the like), the document component management section 103 sets the access attribute 232 and the document component attribute 233 in the document component object 230 generated at the step 702 (step 703). The step 703 is followed by a step 704 at which the document component management section 103 stores or saves the document component object 230 (FIG. 11B) in the server storage unit 107 through the server data management section 106 and returns control to the server transaction management section 105. Instead of setting the access attribute 2544 designated by the user in the access attribute 232 of the document component object 230 directly, the access control management section 102 may generate a correspondence table which consists of the document component identifier, the access attribute for the document component indicated by the document component identifier, and the user or the group to store the correspondence table in the server storage unit 107 and may set an index of the correspondence table in the access attribute 232 of the document component object 230.

Referring to FIG. 14 again, when the performing of the operation related to the global transaction comes to an end, the server transaction management section 105 releases the locking of the document component which is the modification object directly (step 505). However, the releasing of the locking or the step 505 is skipped in a case where the document component of the object disappears such as deletion. In addition, the step 505 is also skipped in another case where the locking of the document component is not carried out at the step 503 such as the new generation of the document. Subsequently, the server transaction management section 105 determines again whether or not the global transaction is a transaction accompanied with modification of document structure in the similar manner at the step 501 (step 506). When the global transaction is the transaction accompanied with the modification of the document structure, the server transaction management section 105 modifies the document structure via the document structure management section 104 and stores or saves, in the server storage unit 107, the document structure after modified (step 507). Thereafter, if there is the document component which is locked at the step 502, the server transaction management section 105 releases the locking thereof (step 508).

It is presumed that a new document component is generated for the already generated document in the modification of the document structure at the step 507. In this event, the document structure management section 194 carries out processings of adding information related to the new generated document component into the document structure data 216 (FIG. 11A) which is already generated and deleting the information in a case of deletion of the document component.

As described above, the performing of the global transaction is carried out by the document server 100 at the step 403 of FIG. 13.

(3) Transmission of a local transaction.

Turning back to FIG. 13, when the performing of the global transaction comes to an end in the document server 100, the server transaction management section 105 carries out a transmission processing of the local transaction (step 420). The local transaction to be transmitted is basically identical with the global transaction which is generated on the basis of the original transaction received at the step 401. It is assumed that the original transaction is the transaction related to the new generation of the document. In this event, the document identifier 211 (FIG. 11A) set in the document object 210 generated in the processing illustrated in FIG. 15 is set in the document identifier 2542 (FIG. 11C) in the transaction data 254. It is assumed that the original transaction is the transaction related to the new generation of the document component. In this event, the document component identifier 231 (FIG. 11B) set in the document component object 230 generated in the processing illustrated in FIG. 16 is set in the document component identifier 2543 (FIG. 11C) in the transaction data 254. In addition, their identifiers are set in the transaction data of the global transaction which is stored in the server storage unit 107 at the step 402.

The local transaction to be transmitted is given to the server communication processing section 101 from the server transaction management section 105. The server communication processing section 101 delivers the document identifier 2542 (FIG. 11C) in the transaction data 254 to the access control management section 102 when the document component identifier 2543 in the transaction data 254 of the local transaction has the value of "NULL". The server communication processing section 101 delivers the document component identifier 2543 (FIG. 11C) in the transaction data 254 to the access control management section 102 when the document component identifier 2543 in the transaction data 254 of the local transaction does not have the value of "NULL". When the document identifier 2542 is delivered to the access management section 102, the access management section 102 retrieves, from the document objects stored in the server storage unit 107, the access attribute 212 (FIG. 11A) in the document object 210 corresponding to the delivered document identifier 2542 via the server data management section 106. When the document component identifier 2543 is delivered to the access management section 102, the access management section 102 retrieves, from the document component objects stored in the server storage unit 107, the access attribute 232 (FIG. 11B) in the document component object 230 corresponding to the delivered document component identifier 2543 via the server data management section 106. The access control management section 102 determines, on the basis of the access attribute obtained, the clients to which the local transaction should be transmitted (step 421). Accordingly, in a case where the local transaction is the local transaction related to the new generation of the document, the access control management section 102 determines the clients to be transmitted in accordance with the access attribute 212 (FIG. 11A) in the document object 210 generated in the processing illustrated in FIG. 15. In addition, in another case where the local transaction is the local transaction related to the new generation of the document component, the local transaction related to modification of data of the document component, or the like, the access control management section 102 determines, in accordance with the access attribute 232 (FIG. 11B) in the document component object 230 generated in the processing illustrated in FIG. 16, as destined clients, the clients to which the local transaction should be transmitted.

The access control management section 109 sends information indicative of the destined clients to the server communication processing section 101. The server communication processing section 101 transmits the local transaction to each of the destined clients (step 422). In this transmission processing, the document server 100 obtains transmission confirmation for the local transaction from each destined client. If the document server 100 fails to transmit the local transaction because of breakdown of a particular client or disconnection of the particular client from the network, the document server 100 records that effect. When restarting of the particular client of connection of the particular client to the network enables the document server 100 to communicate with the particular client, the document server 100 retries the transmission of the local transaction by using the global transaction stored in the server storage unit 107. As a result, it is an assurance that the local transaction is surely transmitted to the clients related to the local transaction with time and failure overcome.

(4) Processing of the local transaction in each client that is transmitted from the document server.

Figure 17:
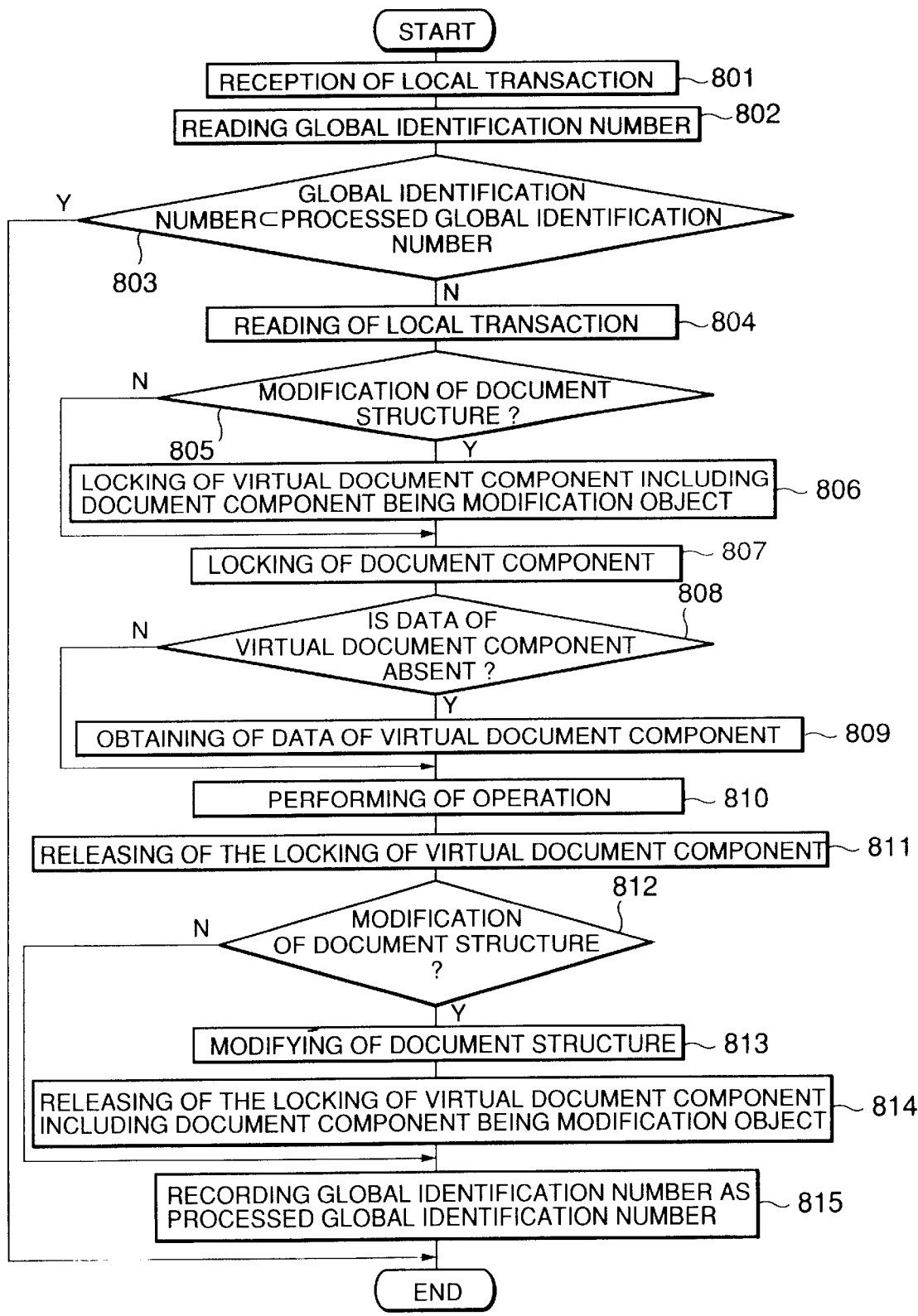
FIG. 17 is a flow chart for use in describing a processing operation of a local transaction in each client.

Referring to FIG. 17 in addition to FIG. 10, the description will proceed to operation of processing of the local transaction in each client 110. Transmitted from the document server 100 via the network, the local transaction is received in the client communication processing section 111 of the client 110 (step 801). The client communication processing section 111 delivers the local transaction to the client transaction management section 115. The step 801 proceeds to a step 802 at which the client transaction management section 115 reads the global identification number 261 (FIG. 11F) out of the transaction object 260 of the local transaction. The step 802 is followed by a step 803 at which the client transaction management section 115 ascertains whether or not the readout global identification number 261 is one of processed global identification numbers which are recorded in the client storage unit 117. When the readout global identification number 261 is one of the processed global identification numbers (Y in the step 803), the processing comes to an end. This is because a processed local transaction having the above-mentioned one of the processed global identification numbers is transmitted from the document server 100 for some reason again.

It will be presumed that the received local transaction is not yet processed in the client 110 in question. In this event, the step 803 is succeeded by a step 804 at which the client transaction management section 115 reads the local transaction. The step 804 proceeds to a step at which the client transaction management section 115 determines whether or not the local transaction is a transaction accompanied with the modification of the document structure. The transaction which is accompanied with the modification of the document structure is, for example, new generation of a document, a new generation of a document component, deletion of the document, deletion of the document component, and so on. On the other hand, the transaction which is not accompanied with the modification of the document structure is, for example, inputting of data to the document component, modification of the data, and so on.

When the local transaction is the transaction accompanied with the modification of the document structure (Y in the step 805), the step 805 is followed by a step 806 at which the client transaction management section 115 retrieves, from the virtual document structure data 226 (FIG. 11D) managed by the virtual document structure management section 114, the document component including the document component which is directly the modification object by the transaction and locks it if it exists. For instance, when the local transaction is the transaction so as to prepare a new document component β in a document component α, the document component α is locked at the step 806. In addition, although the transaction for the new generation of the document is the transaction accompanied with the modification of the document component, the step 806 is skipped. This is because the document component is not yet prepared.

Subsequently, the client transaction management section 115 locks the document component which is directly the modification object by the current local transaction through the virtual document component management section 113 (step 807). The step 807 is succeeded by a step 808 at which the client transaction management section 115 determines whether or not the client in question holds real data of the virtual document component at present. If the client does not hold the real data of the virtual document component (Y in the step 808), the step 808 proceeds to a step 809 at which the client transaction management section 115 obtains the real data of the virtual document component from the document server 100 by transmitting a document component data acquisition request designating the document identifier and the document component identifier to the document server 100 via the client communication processing section 111. In addition, determination of whether or not the client in question holds the real data of the virtual document component is carried out on the basis of the value of the value of the data pointer 244 (FIG. 11E) of the virtual document component object 240. If the data pointer 244 has the value of "NULL", the determination is made so that the real data is absent. If the data pointer 244 indicates a particular address, the determination is made so that that the real data is present.

In addition, in the document server 100, the document component data acquisition request is received in the server communication processing section 101 and is delivered from the server communication processing section 101 to the document component management section 103 through the document structure management section 104. The document component management section 103 reads data of the document component in question out of the server storage unit 107 via the server data management section 106 and sends it the server communication processing section 101 through the document structure management section 104. The server communication processing section 101 transmits the data of the document component in question to the client 110 which is a request source.

In addition, these steps 807 to 809 are skipped if the local transaction is the transaction for the new generation of the document or the document component.

Thereafter, the client transaction management section 115 performs the operation related to the current local transaction (step 810). It is assumed that the current local transaction indicates an operation for inputting data in a virtual document component in a virtual document or an operation for modifying the data. In this event, the client transaction management section 115 performs, via the virtual document component management section 113, processing of inputting the data 246 (FIG. 11E) in the virtual document component in question or of modifying the data 246. In addition, it is assumed that the current local transaction indicates an operation for deleting the virtual document component. In this event, the client transaction management section 115 deletes the virtual document component in question.

Figure 18:
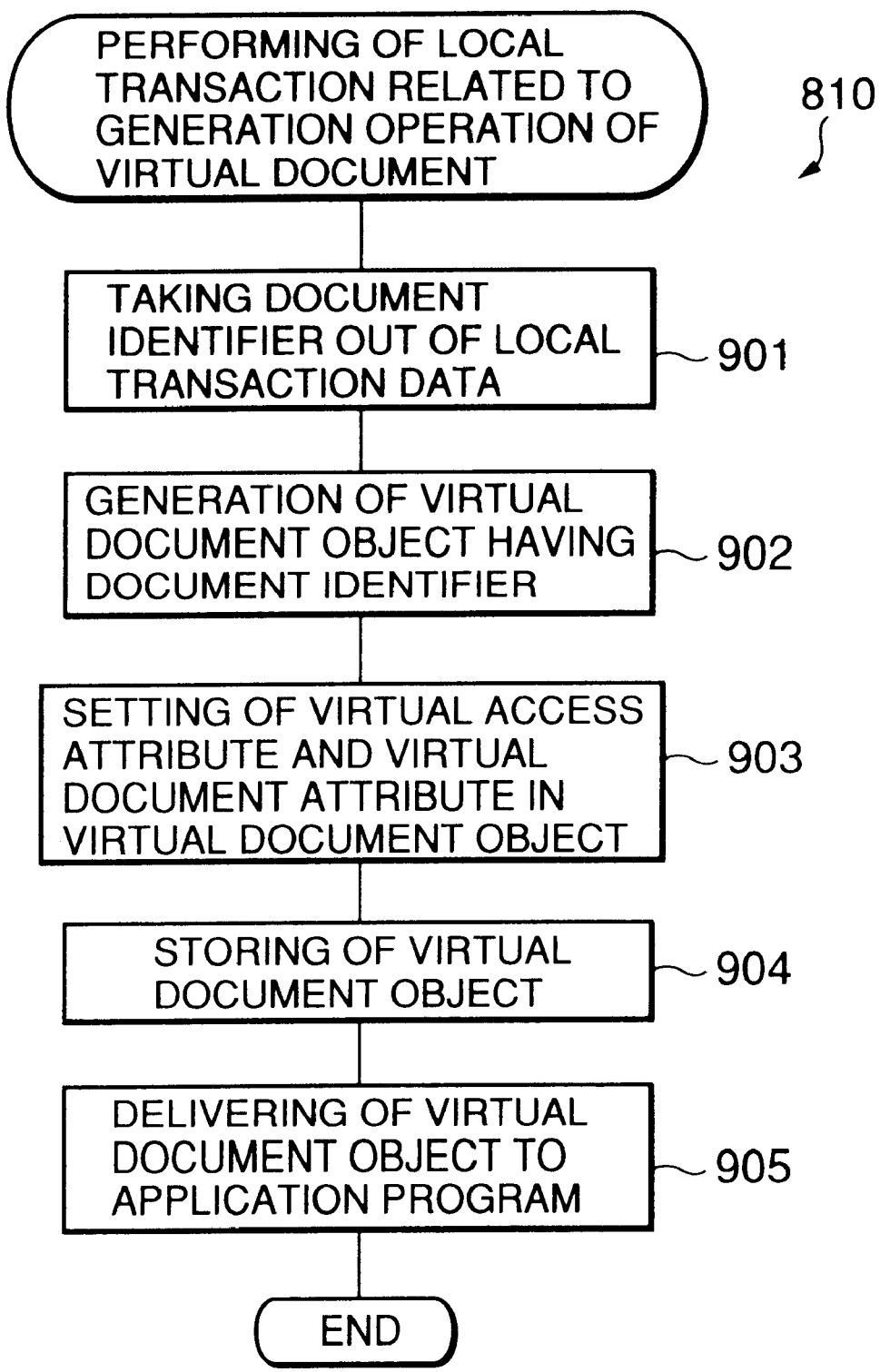
FIG. 18 is a flow chart for use in describing a processing operation at a step 810 of FIG. 17 in a case where the local transaction is related to a generation operation of the document.

Furthermore, when the current local transaction indicates a generation operation of the virtual document of a generation operation of the virtual document component, the client transaction management section 115 performs processing according to them. FIG. 18 shows a processing example at the step 810 in a case where the local transaction relates to the generation operation of the virtual document while FIG. 19 shows a processing example at the step 810 in another case where the local transaction relates to the generation operation of the virtual document component.

Turning to FIG. 18, the description will proceed to operation of a procedure of performing the local transaction related to the generation operation of the virtual document. The client transaction management section 115 passes control to the virtual document structure management section 114. The virtual document structure management section 114 first takes the document identifier 2642 (FIG. 11F) out of the transaction data 264 of the local transaction (step 901). The step 901 proceeds to a step 902 at which the virtual document structure management section 114 generates a virtual document object 220 having the taken document identifier 2642. The generated virtual document object 220 is the virtual document object 220 (FIG. 11D) which comprises the virtual document identifier 221 in which the taken document identifier 2642 is set, the virtual access attribute 222 and the virtual document attribute 223 each of which has a value of "NULL" at this point in time. In addition, the virtual document structure management section 114 secures, in the client storage unit 117, a storage area such as a file for storing the virtual document structure data 226 (FIG. 11D) and sets a pointer thereto in the virtual document structure data pointer 224 (FIG. 11D). Furthermore, the virtual document structure management section 114 sets a current time instant in the access time instant 225.

Subsequently, by referring to information included in the transaction data 264 (FIG. 11F) of the local transaction (the access attribute 2644, the document attribute 2645, or the like), the virtual document structure management section 114 sets the virtual access attribute 222 and the virtual document attribute 223 in the virtual document object 220 generated at the step 902 (step 903). The step 903 is followed by a step 904 at which the virtual document structure management section 114 stores or saves the virtual document object 220 (FIG. 11D) in the client storage unit 117 through the client data management section 116. The step 904 is succeeded by a step 905 at which the virtual document structure management section 114 returns or delivers the virtual document object 220 to the application program 120. Thereafter, when the application program 120 carries out, in response of an operation of the user, the operation for the virtual document object 220, an operation corresponding to the document object 210 resided in the document server 110 is issued or generated as an original transaction. In addition, if an access limitation is set in the virtual access attribute 222 of the virtual document object 220, an available operation is limited to ones defined by the access limitation.

Figure 19:
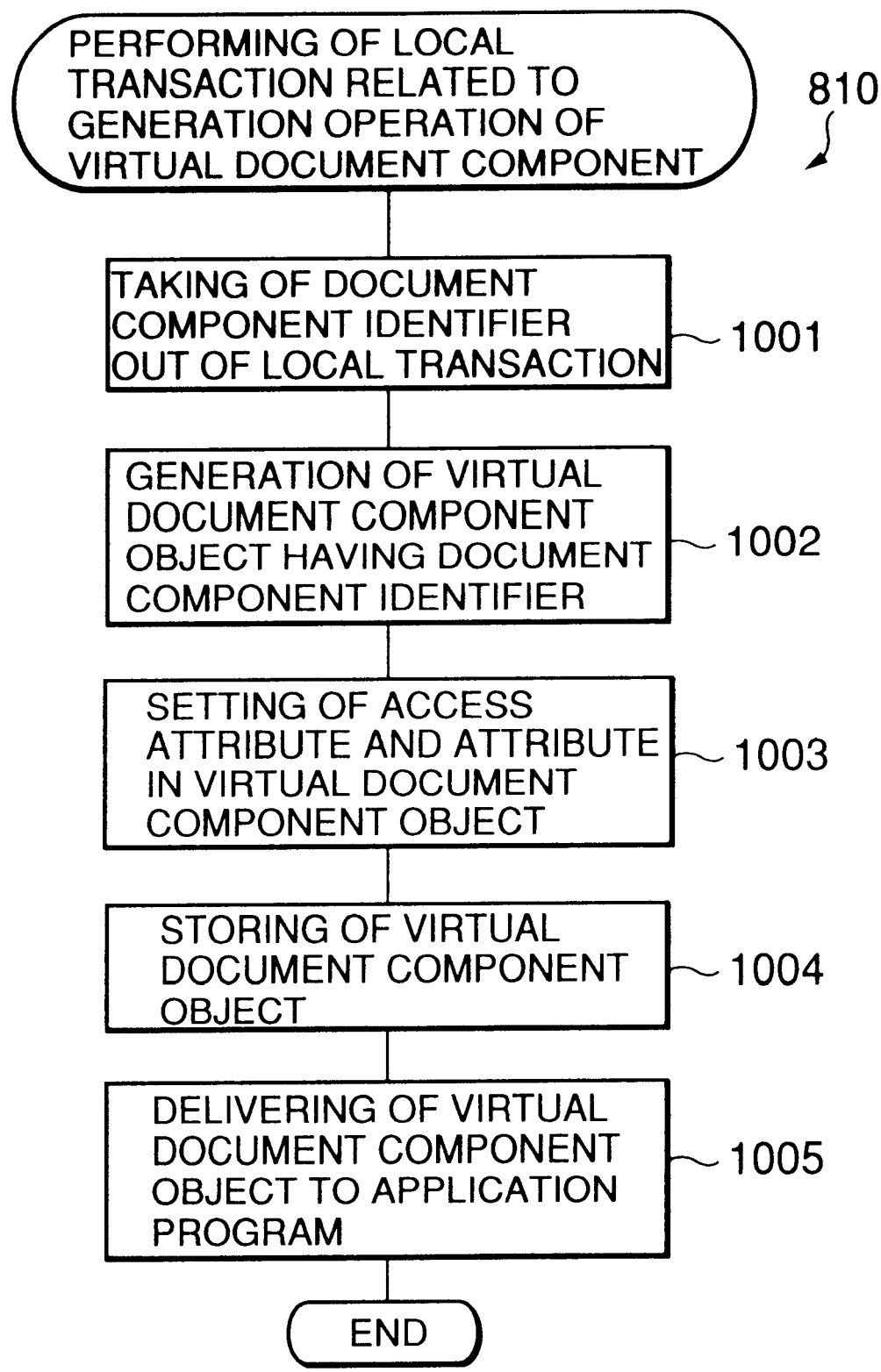
FIG. 19 is a flow chart for use in describing a processing operation at a step 810 of FIG. 17 in another case where the local transaction is related to a generation operation of a document component.

Turning to FIG. 19, the description will proceed to operation of a procedure of performing the local transaction related to the generation operation of the virtual document component. The client transaction management section 115 passes control to the virtual document component management section 113. The virtual document component management section 113 first takes the document component identifier 2643 (FIG. 11F) out of the transaction data 264 of the local transaction (step 1001). The step 1001 proceeds to a step 1002 at which the virtual document component management section 113 generates a virtual document component object 240 having the taken document component identifier 2643. The generated virtual document component object 240 is the virtual document component object 240 (FIG. 11E) which comprises the virtual document component identifier 241 in which the taken document component identifier is set, the virtual access attribute 242 and the virtual document component attribute 243 each of which has a value of "NULL" at this point in time. In addition, the virtual document component management section 113 secures, in the client storage unit 117, a storage area such as a file for storing the data 246 (FIG. 11E) of the virtual document component and sets a pointer thereto in the data pointer 244 (FIG. 11E).

Subsequently, by referring to information included in the transaction data 264 (FIG. 11F) of the local transaction (the access attribute 2644, the attribute 2645, or the like), the virtual document component management section 113 sets the access attribute 242 and the attribute 243 in the virtual document component object 240 generated at the step 1002 (step 1003). The step 1003 is followed by a step 1004 at which the virtual document component management section 113 saves or stores the virtual document component object 240 (FIG. 11E) in the client storage unit 117 through the client data management section 116. The step 1004 is succeeded by a step 1005 at which the virtual document component management section 113 returns or delivers the virtual document component object to the application program 120. Thereafter, when the application program 120 carries out, in response of an operation of the user, the operation for the virtual document component object 240, an operation corresponding to the document component object 230 resided in the document server 110 is issued or generated as an original transaction. In addition, if an access limitation is set in the virtual access attribute 242 of the virtual document component object 240, an available operation is limited to ones defined by the access limitation.

Referring to FIG. 17 again, when the performing of the operation related to the local transaction comes to an end, the client transaction management section 115 releases the locking of the virtual document component which is the modification object directly (step 811). However, the releasing of the locking or the step 811 is skipped in a case where the virtual document component of the object disappears such as deletion. In addition, the step 811 is also skipped in another case where the locking of the virtual document component is not carried out at the step 807 such as the new generation of the virtual document. Subsequently, the client transaction management section 115 determines again whether or not the local transaction is a transaction accompanied with modification of document structure in the similar manner at the step 805 (step 812). When the local transaction is the transaction accompanied with the modification of the document structure, the step 812 proceeds to a step 813 at which the client transaction management section 115 modifies the document structure via the virtual document structure management section 114. Thereafter, if there is the virtual document component which is locked at the step 806, the client transaction management section 115 releases the locking thereof (step 814).

It is presumed that a new virtual document component is generated for the already generated document in the modification of the virtual document structure at the step 813. In this event, the virtual document structure management section 114 carries out processings of adding information related to the new generated virtual document component into the virtual document structure data 216 (FIG. 11D) which is already generated and of deleting the information in a case of deletion of the virtual document component. In addition, if the virtual document structure data 226 in question is absent, the client transaction management section 115 suitably obtains the virtual document structure data 226 by transmitting a document structure data acquisition request to the document server 100. Determination of whether or not the client in question holds the virtual document structure data 226 is carried out on the basis of the value of the virtual document structure data pointer 224 (FIG. 11D) of the virtual document object 220. If the virtual document structure data pointer 224 has the value of "NULL", the determination is made so that the virtual document structure data 226 is absent. If the virtual document structure data pointer 224 indicates a particular address, the determination is made so that the virtual document structure data 226 is present.

In addition, in the document server 100, the document structure data acquisition request is received in the server communication processing section 101 and is delivered from the server communication processing section 101 to the document structure management section 104. The document structure management section 104 reads the document structure data 216 in question and the document component object 230 related thereto out of the server storage unit 107 via the server data management section 106. Thereafter, the document structure management section 104 refers to the access attribute 232 of each document component object 230 to prepare document structure data which lets the client of a request source see the document components only and transmits the prepared document structure data to the client 110 of the request source through the server communication processing section 101.

Finally, the client transaction management section 115 records the global identification number of the local transaction in question into the client storage unit 117 via the client data management section 116 as a processed global identification number (step 815).

By carrying out the above-mentioned operations by the document server 100 and each client 110, it is possible to realize a document sharing management so that a part of data element of a document can be edited for the same contents by all of the clients, another part of the data elements of the document can be edited by specific ones or a group in the clients only, and a still another part of the data elements of the document can be used as a memorandum for private use.

In addition, inasmuch as the prepared document object and the prepared document component objects are stored or saved in the server storage unit 107, it is possible to reuse them later. More specifically, it will be assumed that a document display request designating a specific document identifier is sent from a particular client 110 being a request source to the document server 100. In this event, the document structure management section 104 retrieves the document object 210 having the specific document identifier from server storage unit 107 to obtain it. When the access attribute 212 of the document object 210 permits utilization of the document in the particular client 110 of the request source, document structure management section 104 transmits the document object 210 to the particular client 110 of the request source. In addition, the document structure management section 104 retrieves, from the server storage unit 107, the document component object 230 of the document component which is one in the document and which utilization in the particular client of the request source is permitted to obtain it, and transmits it to the particular client of the request source.

The description will proceed to other distributed systems according to other embodiments of this invention.

(A) On transmission of the local transaction, the document server 100 may transmit, without the transmission of all of the data elements of local transaction, a part of the data elements of local transaction that includes data peculiar to the document server 100 to a specific client which is a transmission source for transmitting an original transaction. Particularly, in the above-mentioned preferred embodiment, the document server 100 transmits all of the data elements of the local transaction to each client to be informed at the step 420 of FIG. 13. However, the local transaction is substantially identical with the original transaction transmitted from the specific client naturally and the specific client saves or stores the original transaction on transmission of the original transaction at the step 313 of FIG. 12. Accordingly, it is useless to transmit all of the data elements of the local transaction to the specific client. Therefore, in another embodiment, the document server 100 transmits, to the specific client, data where the specific client does not store only. For instance, it is presumed that the specific client transmits the original transaction indicative of inputting or modifying data of a document component. In this event, inasmuch as it is unnecessary to transmit transaction data, the document server 100 transmits, for example, data where the transaction data pointer 253 (FIG. 11C) of the transaction object 250 is NULL to the specific client to inform of the global identification number only. As a result, it is possible to suppress a load of the network because a transmission amount of necessary data is decreased.

(B) On reception of an original transaction related to an editing operation for a document component to process the original transaction as a global transaction, the document server 100 may hold or store in the server storage unit 107, without the latest edited contents, data indicative of a correspondence relationship between an identifier of the document component and a client holding the latest edited contents and the real latest edited contents may be held in the client 110. In such a modification, on reusing of the document, it is necessary for the document server 100 to carry out the procedures of investigating the correspondence relationship between the identifier of the document component and the client holding the latest edited contents thereof, obtaining the latest edited contents from the client in question, and transmitting it to the client which reuses the document. However, the modification is advantageous in that it is possible to cut a necessary storage capacity for the document server 100 in comparison with a case where the document server 100 collectively supervises all of the document components.

Furthermore, in addition to the last-mentioned embodiment, the document component management section 103 of the document server 100 may be used in the similar manner as the virtual document component management section 113 on each client in order to temporarily store, in the document server 100, the latest document component managed by each client 110. Under the circumstances, it is possible to access the latest document component stored in the document server 100 although the client is broken down or is disconnected to the network.

(C) On transmitting any original transaction to the document server 100, each client may collectively transmit a set of original transactions related in a sense to each other as a collected original transaction. More specifically, after the step 313 of FIG. 12, processing directly comes to an end. Thereafter, when an operation designated by the application program 120 continues, the client transmits, as the collected original transaction, a current original transaction with collected to a stored original transaction at the step 314. By doing in such a manner, it is possible for the application program 120 to perform a large significant unit of transaction.

(D) The document server 100 may be provided with a module for dispersively supervising names of the document identifiers or the document component identifiers in order to supervise a document by a plurality of document servers. With this structure, in the procedure of generation of the original transaction of FIG. 12, before the step 311, the client searches the modules of the document servers for a particular document server supervising the document component on the basis of the document component identifier and transmits the original transaction to the particular document server at the step 314.

While this invention has so far been described in conjunction with a few embodiments thereof, it will readily be possible for those skilled in the art to put this invention into practice in other manner. For example, a program realizing the above-mentioned document sharing management method may be recorded in a recording medium 120 as shown at a broken line in FIG. 10. Herein, the "recording medium" means a recording medium for recording the program which enables a computer system to read. For example, the recording medium may be a compact disc read only memory (CD-ROM), a magnetic disk such as a floppy or flexible disk, a semiconductor memory, or the like. At any rate, such a program is installed from the recording medium in the computer system.

What is claimed is:

1. A method of managing a document for near-simultaneous generation and editing of content by a plurality of users employing a plurality of clients with all clients accessing the document displaying the content as it is generated and edited, wherein the document is shared in a distributed system comprising a document server and the plurality of clients which are connected to said document server via a network, said method comprising the steps of:

a) carrying out a generation operation for the document via an application program on a specific document generation client by a user to produce an original document generation transaction related to generation of the document, said specific document generation client being one of said plurality of clients;

b) transmitting, from said specific document generation client to said document server, the original document generation transaction which designates a document access attribute of the document to be generated, said document access attribute identifying clients which may access the document;

c) receiving the original document generation transaction in said document server;

d) processing, in said document server, said original document generation transaction as a global document generation transaction to produce a document object;

e) transmitting, from said document server to each client corresponding to the document access attribute designated by the global document generation transaction, the global document generation transaction as a local document generation transaction;

f) receiving the local document generation transaction in each client corresponding to the document access attribute designated by the global document generation transaction;

g) performing, in each client receiving the local document generation transaction, the local document generation transaction to produce a virtual document object corresponding to the document object generated in said document server; and h) returning, in each client performing the local document generation transaction, the virtual document object to an application program thereof;

wherein said document comprises a plurality of document components, said method further comprising the steps of:

aa) carrying out a generation operation for a particular document component via an application program of a specific document component via an application program of a specific document component generation client by a user to produce an original document component generation transaction related to generation of the particular document component, the particular document component being one of the plurality of document components, said specific document component generation client being any one of said plurality of clients identified in said document access attribute as having write access to said document;

bb) transmitting, from said specific document component generation client to said document server, the original document component generation transaction which designates a component access attribute of the particular document component to be generated said component access attribute identifying clients which may access the particular document component;

cc) receiving the original document component generation transaction in said document server;

dd) processing, in said document server, said original document component generation transaction as a global document component generation transaction to produce a document component object;

ee) transmitting, from said document server to each client corresponding to the component access attribute designated by the global document component generation transaction, the global document component generation transaction as a local document component generation transaction;

ff) receiving the local document component generation transaction in each client corresponding to the component access attribute designated by the global document component generation transaction;

gg) performing, in each client receiving the local document component generation transaction, the local document component generation transaction to produce a virtual document component object corresponding to said document component object generated in said document server; and hh) returning, in each client performing the local document component generation transaction, the virtual document object to an application program thereof.

2. A method as claimed in claim 1, wherein said method further comprises the steps of:

i) storing, after step d), the global document generation transaction in said document server as a stored global document generation transaction; and j) retrying, in said document server after step e), transmission of the stored global document generation transaction to each client where said document server cannot obtain an acknowledgement of the local document generation transaction.

3. A method as claimed in claim 1, wherein said method further comprises the steps of:

k) storing, after said step a), the original document generation transaction in said specific document generation client; and l) transmitting from said document server, on transmission of the local document generation transaction at said step e), a part of data elements of the local document generation transaction that includes data peculiar to said document server alone to said specific document generation client without transmitting data elements transmitted to said document server in said original document generation transaction.

4. A method as claimed in claim 1, further comprising the steps of:

ii) storing, after said step dd), the global document component generation transaction in said document server as a stored global document component generation transaction; and jj) retrying, in said document server after step ee), transmission of the stored global document component generation transaction to each client where said document server cannot obtain an acknowledgement of the local document generation transaction.

5. A method as claimed in claim 1, further comprising the steps of:

kk) storing, after said step aa), the original document component generation transaction in said specific document component generation client; and transmitting from said document server, on transmission of the local document component generation transaction at said step ee), a part of the data elements of the local document component generation transaction that includes data peculiar to said document server alone to said specific document component generation client without transmitting data elements transmitted to said document server in said original document component generation transaction.

6. A method as claimed in claim 1, further comprising the steps of:

aaa) carrying out an editing operation for the particular document component via an application program of a specific editing client by a user to produce an original editing transaction related to editing of the particular document component, said specific editing client being any one of said plurality of clients identified in said component access attribute as having editing access to said particular document component;

transmitting, from said specific editing client to said document server, the original editing transaction which designates a component access attribute to the particular document component to be edited;

ccc) receiving the original editing transaction in said document server;

ddd) processing, in said document server, the original editing transaction as a global editing transaction to operated said document component object for the particular document component;

eee) transmitting, from said document server to each client corresponding to the component access attribute related to the particular document component, the global editing transaction as a local editing transaction;

fff) receiving the local editing transaction in each client corresponding to the component access attribute related to the particular document component;

ggg) performing, in each client receiving the local editing transaction, the local editing transaction to produce a virtual document component object for the particular document component and to prepare edited data; and hhh) returning, in each client performing the local editing transaction, the edited data to an application program thereof.

7. A method as claimed in claim 6, wherein said method further comprising the steps of:

iii) storing, after said step ddd), the global editing transaction to said document server as a stored global editing transaction; and jjj) retrying, in said document server after said step eee), transmission of the stored global editing transaction to each client where said document server cannot obtain an acknowledgement of the local editing transaction.

8. A method as claimed in claim 6, wherein said method further comprising the step of kkk) storing, after said step aaa), the original editing transaction in said specific editing client, said document server transmitting, on transmission of the local editing transaction at said step eee), a part of the data elements of the local editing transaction that includes data particular to said document server alone to said specific editing client.

9. A method as claimed in claim 6, wherein each client holds the latest edited contents, said document server holding, on processing the global editing transaction at said step ddd), data indicative of a correspondence relationship between an identifier of the particular document component and the client holding the latest edited contents without holding the latest edited contents.

10. A method as claimed in claim 6, wherein each client collectively transmits, on transmitting any original transaction to said document server, a set of original transactions related in a sense to each other as a collected original transaction.

11. A distributed system for near-simultaneous generation and editing of a document by a plurality of users comprising a document server and a plurality of clients which are connected to said document server via a network, each of said plurality of clients comprising:

means for carrying out a generation operation for a document via an application program thereof by a user to produce an original document generation transaction related to generation of the document; and means for transmitting, to said document server, the original document generation transaction which designates a document access attribute of the document to be generated, said document access attribute identifying clients which may access the document, said document server comprising:

means for receiving the original document generation transaction;

means for processing said original document generation transaction as a global document generation to produce a document object; and means for transmitting, to each client corresponding to the document access attribute designated by the global document generation transaction, the global document generation transaction as a local document generation transaction, each of said plurality of clients further comprising:

means for receiving the local document generation transaction when the client corresponds to the document access attribute designated by the global document generation transaction;

means for performing, after reception of the local document generation transaction, the local document generation transaction to produce a virtual document object corresponding to the document object generated in said document server; and means for returning, after performing the local document generation transaction, the virtual document object to an application program thereof;

wherein said document comprises a plurality of document components, each of said plurality of clients further comprising:

means for carrying out a generation operation for a particular document component via an application program thereof by a user to produce an original document component generation transaction related to generation of the particular document component, the particular document component being one of the plurality of document components; and means for transmitting, to said document server, the original document component generation transaction which designates a component access attribute of the particular document component to be generated, and said document server further comprising:

means for receiving the original document component generation transaction;

means for processing said original document component generation transaction as a global document component generation transaction to produce a document component object; and means for transmitting, to each client corresponding to the component access attribute designated by the global document component generation transaction, the global document component generation transaction as a local document component generation transaction, and each of said plurality of clients further comprising:

means for receiving the local document component generation transaction when the client corresponds to the component access attribute designated by the global document component generation transaction;

means for performing, after reception of the local document component generation transaction, the local document component generation transaction to produce a virtual document component object corresponding to said document component object generated in said document server; and means for returning, after performing the local document component generation transaction, the virtual document component object to an application program thereof.

12. A distributed system as claimed in claim 11, wherein said document server further comprises:

means for storing, after processing said global document generation transaction, the global document generation transaction therein as a stored global document generation transaction; and means for retrying, after transmitting the local document generation transaction, transmission of the stored global document generation transaction to each of said plurality of clients where said document server cannot obtain an acknowledgement of the local document generation transaction.

13. A distributed system as claimed in claim 11, wherein each of said plurality of clients further comprises means for storing, after carrying out said generation operation of the document, the original document generation transaction therein, and said document server further comprises means for transmitting, on transmission of the local document generation transaction, a part of data elements of the local document generation transaction that includes data peculiar thereto alone to the client in question without transmitting same data elements transmitted to said document server in said original document generation transaction.

14. A distributed system as claimed in claim 11, wherein said document server further comprises:

means for storing, after processing said global document component generation transaction, the global document component generation transaction therein as a stored global document component generation transaction; and means for retrying, after transmitting the local document component generation transaction, transmission of the stored global document component generation transaction to each of said plurality of clients where said document server cannot obtain an acknowledgement of the local document generation transaction.

15. A distributed system as claimed in claim 11, wherein each of said plurality of clients further comprises means for storing, after carrying out said generation operation for the particular document component, the original document component generation transaction therein, and said document server further comprises means for transmitting, on transmission of the local document component generation transaction, a part of data elements of the local document component generation transaction that includes data peculiar thereto alone to the client in question without transmitting some data elements transmitted to said document server in said original document component generation transaction.

16. A distributed system as claimed in claim 11, wherein each of said plurality of clients further comprises:

means for carrying out an editing operation for the particular document component via an application program thereof by a user to produce an original editing transaction related to editing of the particular document component; and means for transmitting, to said document server, the original editing transaction which designates a component access attribute to the particular document component to be edited, said document server further comprises:
  means for receiving the original editing transaction;
  means for processing the original editing transaction as a global editing transaction to operate said document component object for the particular document component; and
  means for transmitting, to each of said plurality of clients corresponding to the component access attribute related to the particular document component, the global editing transaction as a local editing transaction, and each of said plurality of clients further comprises:
  means for receiving the local editing transaction when the client corresponds to the component access attribute related to the particular document component;
  means for performing, after reception of the local editing transaction, the local editing transaction to operate a virtual document component object for the particular document component and to prepare edited data; and
  means for returning, after performing the local editing transaction, the edited data to an application program thereof.

17. A distributed system as claimed in claim 16, wherein said document server further comprises:
  means for storing, after processing the global editing transaction, the global editing transaction therein as a stored global editing transaction; and
  means for retrying, after transmitting the local editing transaction, transmission of the stored global editing transaction to each of said plurality of clients where said document server cannot obtain an acknowledgement of the local editing transaction.

18. A distributed system as claimed in claim 16, wherein each of said plurality of clients further comprises means for storing, after carrying out said editing operation for the particular document component, the original editing transaction therein, and said document server further comprises means for transmitting, on transmission of the local editing transaction, a part of data elements of the local editing transaction that includes data peculiar thereto alone to said client in question without transmitting some data elements transmitted to said document server in said original editing transaction.

19. A distributed system as claimed in claim 16, wherein each of said plurality clients further comprises means for holding the latest edited contents therein, and said document server further comprises means for holding, on processing the global editing transaction, therein data indicative of a correspondence relationship between an identifier of the particular document component and the client holding the latest edited contents without holding the latest edited contents therein.

20. A distributed system as claimed in claim 16, wherein each of said plurality of clients further comprises means for collectively transmitting, on transmitting any original transaction to said document server, a set of original transactions related in a sense to each other as a collected original transaction.

21. A client for use in a distributed system for near-simultaneous generation and editing of a document by a plurality of users comprising a document server and a plurality of clients connected to said document server via a network, said client comprising:
  means for carrying out a generation operation for a document via an application program thereof by a user to produce an original document generation transaction related to generation of the document; and
  means for transmitting, to said document server, the original document generation transaction which designates a document access attribute of the document to be generated; and
  wherein document server transmits a local document generation transaction to each of said plurality of clients corresponding to the document access attribute designated by the original document generation transaction, and wherein said client further comprises:
    means for receiving the local document generation transaction when the client corresponds to the document access attribute designated by the original document generation transaction;
    means for performing, after reception of the local document generation transaction, the local document generation transaction to produce a virtual document object corresponding to a document generated in said document server; and
    means for returning, after performing the local document generation transaction, the virtual document object to an application program thereof;
  wherein said document comprises a plurality of document components, and wherein said client further comprises:
    means for carrying out a generation operation for a particular document component via an application program thereof by a user to produce an original document component generation transaction related to generation of the particular document component, the particular document component being one of the plurality of document components; and
    means for transmitting, to said document server, the original document component generation transaction which designates a component access attribute of the particular document component to be generated.

22. A client as claimed in claim 21, further comprising means for storing, after carrying out said generation operation of the document, the original document generation transaction therein.

23. A document server for use in a distributed system for near-simultaneous generation and editing of a document by a plurality of users comprising a plurality of clients connected to said document server via a network, each of said plurality of clients transmitting, to said document server, an original document generation transaction which designates a document access attribute of a document to be generated, said document server comprising:
  means for receiving the original document generation transaction;
  means for processing said original document generation transaction as a global document generation transaction to produce a document object; and
  means for transmitting, to each of said plurality of clients corresponding to the document access attribute designated by the global document generation transaction, the global document generation transaction as a local document generation transaction;

wherein said document comprises a plurality of document components, each of said plurality of clients transmits, to said document server, an original document component generation transaction which designates a component access attribute of a particular document component to be generated, and wherein said document server further comprises:

means for receiving the original document component generation transaction;

means for processing said original document component generation transaction as a global document component generation transaction to produce a document component object; and means for transmitting, to each client corresponding to the component access attribute designated by the global document component generation transaction, the global document component generation transaction as a local document component generation transaction.

24. A document server as claimed in claim 23, further comprising:

means for storing, after processing said global document generation transaction, the global document generation transaction, the global document generation transaction therein as a stored global document generation transaction; and means for retrying, after transmitting the local document generation transaction, transmission of the stored global document generation transaction to each of said plurality of clients where said document server cannot obtain an acknowledgement of the local document generation transaction.

25. A document server as claimed in claim 23, wherein each of said plurality of clients stores, after carrying out generation operation of the document, an original document generation transaction therein, and wherein said document server further comprises means for transmitting, on transmission of the local document generation transaction, a part of data elements of the local document generation transaction that includes data peculiar thereto alone to the client in question without transmitting some data elements transmitted to said document server in said original document generation transaction.

26. A client as claimed in claim 21, wherein said document server transmits a local document component generation transaction to each of said plurality of clients corresponding to the component access attribute designated by the original document component generation transaction, and wherein said client further comprises:

means for receiving the local document component generation transaction when the client corresponds to the component access attribute designated by the original document component generation transaction;

means for performing, after reception of the local document component generation transaction, the local document component generation transaction to produce a virtual document component object corresponding to a document component object generated in said document server; and means for returning, after performing the local document component generation transaction, the virtual document component object to an application program thereof.

27. A client as claimed in claim 21, further comprising means for storing, after carrying out said generation operation for the particular document component, the original document component generation transaction therein.

28. A document server as claimed in claim 23, further comprising:

means for storing, after processing said global document component generation transaction, the global document component generation transaction therein as a stored global document component generation transaction; and means for retrying, after transmitting the local document component generation transaction, transmission of the stored global document component generation transaction to each of said plurality of clients where said document server cannot obtain an acknowledgement of the local document generation transaction.

29. A document server as claimed in claim 23, wherein each of said plurality of clients store, after carrying out generation operation for the particular document component, an original document component generation transaction therein, and wherein said document server further comprises means for transmitting, on transmission of the local document component generation transaction, a part of data elements of the local document component generation transaction that includes data peculiar thereto alone to the client in question without transmitting some date elements transmitted to said document server in said original document component generation transaction.

30. A client as claimed in claim 21, further comprising:

means for carrying out an editing operation for the particular document component via an application program thereof by a user to produce an original editing transaction related to editing of the particular document component; and means for transmitting, to said document server, the original editing transaction which designates a component access attribute related to the particular document component to be edited.

31. A client as claimed in claim 30, wherein said document server transmits a local editing transaction to each of said plurality of clients corresponding to the component access attribute related to the particular document component, said client further comprising:

means for receiving the local editing transaction when the client corresponds to the component access attribute related to the particular document component;

means for performing, after reception of the local editing transaction, the local editing transaction to operate a virtual document component object for the particular document component and to prepare edited data; and means for returning, after performing the local editing transaction, the edited data to an application program thereof.

32. A client as claimed in claim 30, further comprising means for storing, after carrying out said editing operation for the particular document component, the original editing transaction thereon.

33. A client as claimed in claim 31, further comprising means for holding the latest edited contents therein.

34. A client as claimed in claim 30, further comprising means for collectively transmitting, on transmitting any original transaction to said document server, a set of original transactions related in a sense to each other as a collected original transaction.

35. A document server as claimed in claim 23, wherein each of said plurality of clients transmits, to said document server, an original editing transaction which designates a component access attribute related to the particular document component to be edited, wherein said document server further comprises:

means for receiving the original editing transaction;

means for processing the original editing transaction as a global editing transaction to operate said document component object for the particular document component; and means for transmitting, to each client corresponding to the component access attribute related to the particular document component, the global editing transaction as a local editing transaction.

36. A document server as claimed in claim 35, further comprising:

means for storing, after processing the global editing transaction, the global editing transaction therein as a stored global editing transaction; and means for retrying, after transmitting the local editing transaction, transmission of the stored global editing transaction to each client where said document server cannot obtain an acknowledgement of the local editing transaction.

37. A document server as claimed in claim 35, wherein each of said plurality of clients stores, after carrying out editing operation for the particular document, an original editing transaction therein, and wherein said document server further comprises means for transmitting, on transmission of the local editing transaction, a part of data elements of the local editing transaction that includes data peculiar thereto alone to said client in question without transmitting some data elements transmitted to said document server in said in said original editing transaction.

38. A document server as claimed in claim 35, wherein each client holds the latest edited contents therein, and wherein said document server further comprises means for holding, on processing the global editing transaction, therein data indicative of a correspondence relationship between an identifier of the particular document component and the client holding the latest edited contents without holding the latest edited contents therein.

39. A recording medium for use in a distribute system for near-simultaneous generation and editing of a document by a plurality of users comprising a document server and a plurality of clients connected to said document server via a network, said recording medium recording a first program to make each of said plurality of clients execute the procedures of:

carrying out a generation operation for a document via an application program thereof by a user to produce an original document generation transaction related to generation of the document; and transmitting, to said document server, the original document generation transaction which designates a document access attribute of the document to be generated, said recording medium recording a second program to make said document server execute the procedures of:

receiving the original document generation transaction;

processing said original document generation transaction as a global document generation transaction to produce a document object; and transmitting, to each of said plurality of clients corresponding to the document access attribute designated by the global document generation transaction, the global document generation transaction as a local document generation transaction, said recording medium recording a third program to make each of said plurality of clients execute the procedures of:

receiving the local document generation transaction when the client corresponds to the document access attribute designated by the global document generation transaction;

performing, after reception of the local document generation transaction, the local document generation transaction to produce a virtual document object corresponding to the document object generated in said document server; and returning, after performing the local document generation transaction, the virtual document object to an application program thereof;

wherein said document comprises a plurality of document components, and said recording medium recording a fourth program to make each of said plurality of clients execute the procedures of:

carrying out a generation operation for a particular document component via an application program thereof by a user to produce an original document component generation transaction related to generation of the particular document component, the particular document component being one of the plurality of document components; and transmitting, to said document server, the original document component generation transaction which designates a component access attribute of the particular document component to be generated, said recording medium recording a fifth program to make said document server execute the procedures of:

receiving the original document component generation transaction;

processing said original document component generation transaction as a global document component generation transaction to produce a document component object; and transmitting, to each client corresponding to the component access attribute designated by the global document component generation transaction, the global document component generation transaction as a local document component generation transaction, and said recording medium recording a sixth program to make each of said plurality of clients execute the procedures of:

receiving the local document component generation transaction when the client corresponds to the component access attribute designate by the global document component generation transaction;

performing, after reception of the local document component generation transaction, the local document component generation transaction to produce a virtual document component object corresponding to said document component object generated in said document server; and returning, after performing the local document component generation transaction, the virtual document component object to an application program thereof.

40. A recording medium as claimed in claim 39, wherein said second program further makes said document server execute the procedures of:

storing, after processing said global document generation transaction, the global document generation transaction therein as a stored global document generation transaction; and retrying, after transmitting the local document generation transaction, transmission of the stored global document generation transaction to each of said plurality of clients where said document server cannot obtain an acknowledgement of the local document generation transaction.

41. A recording medium as claimed in claim 39, wherein said first program further makes each of said plurality of clients execute the procedure of storing, after carrying out said generation operation of the document, the original document generation transaction therein, and said second program further makes said document server execute the procedure of transmitting, on transmission of the local document generation transaction, a part of data elements of the local document generation transaction that includes data peculiar thereto alone to the client in question without transmitting some data elements transmitted to said document server in said original editing transaction.

42. A recording medium as claimed in claim 39, wherein said fifth program further makes said document server execute the procedures of:
  storing, after processing said global document component generation transaction, the global document component generation transaction therein as a stored global document component generation transaction; and
  retrying, after transmitting the local document component generation transaction, transmission of the stored global document component generation transaction to each of said plurality of clients where said document server cannot obtain an acknowledgement of the local document generation transaction.

43. A recording medium as claimed in claim 39, wherein said fourth program further makes each of said plurality of clients execute the procedure of storing, after carrying out said generation operation for the particular document component, the original document component generation transaction therein, and said fifth program further makes said document server execute the procedure of transmitting, on transmission of the local document component generation transaction, a part of data elements of the local document component generation transaction that includes data peculiar thereto alone to the client in question without transmitting some data elements transmitted to said document server in said original document generation transaction.

44. A recording medium as claimed in claim 39, wherein said recording medium further records a seventh program to make each of said plurality of clients execute the procedures of:
  carrying out an editing operation for the particular document component via an application program thereof by a user to produce an original editing transaction related to editing of the particular document component; and
  transmitting, to said document server, the original editing transaction which designates a component access attribute to the particular to the particular document component to be edited,
said recording medium recording an eighth program to make said document server execute the procedures of:
  receiving the original editing transaction;
  processing the original editing transaction as a global editing transaction to operate said document component object for the particular document component; and
  transmitting, to each of said plurality of clients corresponding to the component access attribute related to the particular document component, the global editing transaction as a local editing transaction, and
said recording medium recording a ninth program to make each of said plurality of clients execute the procedures of:
  receiving the local editing transaction when the client corresponds to the component access attribute related to the particular document component;
  performing, after reception of the local editing transaction, the local editing transaction to operate a virtual document component object for the particular document component and to prepare edited data; and
  returning, after performing the local editing transaction, the edited data to a application program thereof.

45. A recording medium as claimed in claim 44, wherein said eighth program further makes said document server execute the procedures of:
  storing, after processing the global editing transaction, the global editing transaction therein as a stored global editing transaction; and
  retrying, after transmitting the local editing transaction, transmission of the stored global editing transaction to each of said plurality of clients where said document server cannot obtain an acknowledgement of the local editing transaction.

46. A recording medium as claimed in claim 44, wherein said seventh program further makes each of said plurality of clients execute the procedure of storing, after carrying out said editing operation for the particular document component, the original editing transaction therein, and said eighth program further makes said document server execute the procedure of transmitting, on transmission of the local editing transaction, a part of data elements of the local editing transaction that includes data peculiar thereto alone to said client in question without transmitting some data elements transmitted to said document server in said original editing transaction.

47. A recording medium as claimed in claim 44, wherein said recording medium further records a tenth program to make each of said plurality of clients execute the procedure of holding the latest edited contents therein, and said eighth program further makes said document server execute the procedure of holding, on processing the global editing transaction, therein data indicative or a correspondence relationship between an identifier of the particular document component and the client holding the latest edited contents without holding the latest edited contents therein.

48. A recording medium as claimed in claim 44, wherein said recording medium further records an eleventh program to make each of said plurality of clients execute the procedure of collectively transmitting, on transmitting any original transaction to said document server, a set of original transactions related in a sense to each other as a collected original transaction.

49. A recording medium for recording a first primary program to make a client, in a system for near-simultaneous operation and editing of a document by a plurality of users, execute the procedures of:
  carrying out a generation operation for a document via an application program thereof by a user to produce an original document generation transaction related to generation of the document; and
  transmitting, to a document server, the original document generation transaction which designates a document access attribute related of the document to be generated;
  wherein said document server transmits a local document generation transaction to said client if said client corresponds to the document access attribute designated by the original document generation transaction, wherein said recording medium further records a secondary primary program to make said client execute the procedures of:

receiving the local document generation transaction when the client corresponds to the document access attribute designated by the original document generation transaction;

performing, after reception of the local document generation transaction, the local document generation transaction to produce a virtual document object corresponding to a document object generated in said document server; and returning, after performing the local document generation transaction, the virtual document object to an application program thereof;

wherein said document comprises a plurality of document components, and wherein said recording medium further records a first secondary program to make said client execute the procedures of:

carrying out a generation operation for a particular document component via an application program thereof by a user to produce an original document component generation transaction related to generation of the particular document component, the particular document component being one of the plurality of document components; and transmitting, to said document server, the original document component generation transaction which designates a component access attribute of the particular document component to be generated.

50. A recording medium as claimed in claim 49, wherein said first primary program further makes said client execute the procedure of storing, after carrying out said generation operation of the document, the original document generation transaction therein.

51. A recording medium for recording a primary program to make a document server, in a system for near-simultaneous generation and editing of a document by a plurality of users, execute the procedures of:

receiving, from any one of a plurality of clients, an original document generation transaction which designates a document access attribute of a document to be generated;

processing said original document generation transaction as a global document generation transaction to produce a document object; and transmitting, to each of said plurality of clients corresponding to the access attribute designated by the global document generation transaction, the global document generation transaction as a local document generation transaction;

wherein said document comprises a plurality of document components, each of said plurality of clients transmits, to said document server, an original document component generation transaction which designates a component access attribute of a particular document component to be generated, and wherein said recording medium further records a secondary program to make said document server execute the procedures of:

receiving the original document component generation transaction;

processing said original document component generation transaction as a global document component generation transaction to produce a document component object; and transmitting, to each of said plurality of clients corresponding to the component access attribute designated by the global document component generation transaction, the global document component generation transaction as a local document component generation transaction.

52. A recording medium as claimed in claim 51, wherein said primary program further makes said document server execute the procedures of:

storing, after processing said global document generation transaction, the global document generation transaction therein as a stored global document generation transaction; and retrying, after transmitting the local document generation transaction, transmission of the stored global document generation transaction to each of said plurality of clients where said document server cannot obtain an acknowledgement of the local document generation transaction.

53. A recording medium as claimed in claim 51, wherein each of said plurality of clients stores, after carrying out a generation operation of the document, an original document generation transaction therein, and wherein said primary program further makes said document server execute the procedure of transmitting, on transmission of the local document generation transaction, a part of data elements of the local document generation transaction that includes data peculiar thereto alone to the client in question without transmitting data elements transmitted to said document server in said original document generation transaction.

54. A recording medium as claimed in claim 49, wherein said document server transmits a local document component generation transaction to said client if said client corresponds to the access attribute designated by the original document component generation transaction, and wherein said recording medium further records a second secondary program to make said client execute the procedures of:

receiving the local document component generation transaction when the client corresponds to the component access attribute designated by the original document component generation transaction;

performing, after reception of the local document component generation transaction, the local document component generation transaction to produce a virtual document component object corresponding to a document component object generated in said document server; and returning, after performing the local document component generation transaction, the virtual document component object to an application program thereof.

55. A recording medium as claimed in claim 49, wherein said first secondary program further makes said client execute the procedure of storing, after carrying out said generation operation for the particular document component, the original document component generation transaction therein.

56. A recording medium as claimed in claim 51, wherein said secondary program further makes said document server execute the procedures of:

storing, after processing said global document component generation transaction, the global document component generation transaction therein as a stored global document component generation transaction; and retrying, after transmitting the local document component generation transaction, transmission of the stored global document component generation transaction to each of said plurality of clients where said document server cannot obtain an acknowledgement of the local document generation transaction.

57. A recording medium as claimed in claim 51, wherein each of said plurality of clients store, after carrying out a generation operation for the particular document component, an original document component generation transaction therein, and wherein said secondary program further makes said document server execute the procedure of transmitting, on transmission of the local document component generation transaction, a part of data elements of the local document component generation transaction that includes data peculiar thereto alone to the client in question without transmitting some data elements that were transmitted to said document server in the original component generation transaction.

58. A recording medium as claimed in claim 54, wherein said recording medium further records a first ternary program to make said client execute the procedures of:

carrying out an editing operation for the particular document component via an application program thereof by a user to produce an original editing transaction related to editing of the particular document component; and transmitting, to a document server, the original editing transaction which designates a component access attribute related to the particular document component to be edited.

59. A recorded medium as claimed in claim 58, wherein said document server transmits a local editing transaction to said client if said client corresponds to the component access attribute related to the particular document component, and wherein said recording medium further records a seconda ternary program to make said client execute the procedures of receiving the local editing transaction when the client corresponds to the component access attribute related to the particular document component;

performing, after reception of the local editing transaction, the local editing transaction to operate a virtual document component object for the particular document component and to prepare edited data; and returning, after performing the local editing transaction the edited data to an application program thereof.

60. A recording medium as claimed in claim 58, wherein said first ternary program further makes said client execute the procedure of storing, after carrying out said editing operation for the particular document component, the original editing transaction therein.

61. A recording medium as claimed in claim 59, wherein said second ternary program further makes said client execute the procedures of holding the latest edited contents therein.

62. A recording medium as claimed in claim 58, wherein said recording medium further records a third ternary program to make said client execute the procedures of collectively transmitting, on transmitting any original transaction to said document server, a set of original transactions related in a sense to each other as a collected original transaction.

63. A recording medium as claimed in claim 51, wherein each of said plurality of clients transmits, to said document server, an original editing transaction which designates a component access attribute related to the particular document component to be edited, and wherein said recording medium further records a ternary program to make said document server execute the procedures of:

receiving the original editing transaction;

processing the original editing transaction as a global editing transaction to operate said document component object for the particular document component; and transmitting, to each of said plurality of clients corresponding to the component access attribute related to the particular document component, the global editing transaction as a local editing transaction.

64. A recording medium as claimed in claim 63, wherein said ternary program further makes said document server execute the procedures of:

storing, after processing the global editing transaction, the global editing transaction therein as a stored global editing transaction; and retrying, after transmitting the local editing transaction, transmission of the stored global editing transaction to each of said plurality of clients where said document server cannot obtain an acknowledgement of the local editing transaction.

65. A recording medium as claimed in claim 63, wherein each of said plurality of clients stores, after carrying out an editing operation for the particular document component, an original editing transaction therein, and wherein said ternary program further makes said document server execute the procedure of transmitting, on transmission of the local editing transaction, a part of data elements of the local editing transaction that includes data peculiar thereto alone to said client in question without transmitting some data elements transmitted to said document server in said original editing transaction.

66. A recording medium as claimed in claim 63, wherein each of said plurality of clients hold the latest edited contents therein, and wherein said ternary program further makes said document server execute the procedure of holding, on processing the global editing transaction, therein data indicative of a correspondence relationship between an identifier of the particular document component and the client holding the latest edited contents without holding the latest edited contents therein.

* * * * *